US008335868B2

(12) United States Patent
Pyeon et al.

(10) Patent No.: US 8,335,868 B2
(45) Date of Patent: Dec. 18, 2012

(54) APPARATUS AND METHOD FOR ESTABLISHING DEVICE IDENTIFIERS FOR SERIALLY INTERCONNECTED DEVICES

(75) Inventors: Hong Beom Pyeon, Kanata (CA); HakJune Oh, Kanata (CA); Jin-Ki Kim, Kanata (CA)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 114 days.

(21) Appl. No.: 11/750,649

(22) Filed: May 18, 2007

(65) Prior Publication Data

US 2007/0233917 A1 Oct. 4, 2007

Related U.S. Application Data

(63) Continuation-in-part of application No. 11/521,734, filed on Sep. 15, 2006.

(60) Provisional application No. 60/802,645, filed on May 23, 2006, provisional application No. 60/787,710, filed on Mar. 28, 2006.

(51) Int. Cl.
G06F 3/00 (2006.01)
G06F 12/00 (2006.01)
G06F 13/00 (2006.01)
G06F 13/28 (2006.01)

(52) U.S. Cl. .................. 710/8; 710/9; 711/154; 711/167

(58) Field of Classification Search .................. 711/154, 711/167

See application file for complete search history.

(56) References Cited

U.S. PATENT DOCUMENTS

| 4,174,536 | A | 11/1979 | Misunas et al. |
| 4,733,376 | A | 3/1988 | Ogawa |
| 4,796,231 | A | 1/1989 | Pinkham |
| 5,126,808 | A | 6/1992 | Montalvo et al. |
| 5,136,292 | A | 8/1992 | Ishida |
| 5,175,819 | A | 12/1992 | Le Ngoc et al. |
| 5,204,669 | A | 4/1993 | Dorfe et al. |
| 5,243,703 | A | 9/1993 | Farmwald et al. |

(Continued)

FOREIGN PATENT DOCUMENTS

EP 1326172 7/2003

(Continued)

OTHER PUBLICATIONS

"Toshiba MOS Digital Integrated Circuit Silicon Gate CMOS", TH58NVG1S3AFT05, Toshiba Corporation, May 19, 2003, pp. 1-32.

(Continued)

Primary Examiner — Kris Rhu
(74) Attorney, Agent, or Firm — Mukundan Chakrapani; Borden Ladner Gervais LLP

(57) ABSTRACT

A method or apparatus operates a multitude of devices in a serial interconnection configuration to establish a device identifier (ID) for each device. An input signal is transmitted through a serial interconnection to a first device using inputs that are also used by the first device to input other information thereto (e.g., data, commands, control signals). A generating circuit generates a device ID in response to the input signal. A transfer circuit then transfers an output signal associated with the device ID to a second device through a serial output of the first device. The serial output is also used by the first device to output other information (e.g., signals, data) to another device in the serial interconnection configuration.

41 Claims, 27 Drawing Sheets

U.S. PATENT DOCUMENTS

| | | | |
|---|---|---|---|
| 5,249,270 A | 9/1993 | Stewart et al. | |
| 5,280,539 A | 1/1994 | Yeom et al. | |
| 5,319,598 A | 6/1994 | Aralis et al. | |
| 5,365,484 A | 11/1994 | Cleveland et al. | |
| 5,404,460 A | 4/1995 | Thomsen et al. | |
| 5,430,859 A | 7/1995 | Norman et al. | |
| 5,440,694 A | 8/1995 | Nakajima | |
| 5,452,259 A | 9/1995 | McLaury | |
| 5,473,563 A | 12/1995 | Suh et al. | |
| 5,473,566 A | 12/1995 | Rao | |
| 5,473,577 A | 12/1995 | Miyake et al. | |
| 5,596,724 A | 1/1997 | Mullins et al. | |
| 5,602,780 A | 2/1997 | Diem et al. | |
| 5,636,342 A * | 6/1997 | Jeffries | 714/48 |
| 5,671,178 A | 9/1997 | Park et al. | |
| 5,721,840 A | 2/1998 | Soga | |
| 5,740,379 A | 4/1998 | Hartwig | |
| 5,761,146 A | 6/1998 | Yoo et al. | |
| 5,771,199 A | 6/1998 | Lee | |
| 5,802,006 A | 9/1998 | Ohta | |
| 5,806,070 A | 9/1998 | Norman et al. | |
| 5,818,785 A | 10/1998 | Ohshima | |
| 5,828,899 A | 10/1998 | Richard et al. | |
| 5,835,935 A | 11/1998 | Estakhri et al. | |
| 5,859,809 A | 1/1999 | Kim | |
| 5,860,080 A * | 1/1999 | James et al. | 711/4 |
| 5,872,994 A | 2/1999 | Akiyama et al. | |
| 5,928,343 A * | 7/1999 | Farmwald et al. | 710/104 |
| 5,937,425 A | 8/1999 | Ban | |
| 5,941,974 A | 8/1999 | Babin | |
| 5,959,930 A | 9/1999 | Sakuria | |
| 5,995,417 A | 11/1999 | Chen et al. | |
| 6,002,638 A | 12/1999 | John | |
| 6,026,098 A * | 2/2000 | Kamoi et al. | 370/539 |
| 6,085,290 A | 7/2000 | Smith et al. | |
| 6,091,660 A | 7/2000 | Sasaki et al. | |
| 6,107,658 A | 8/2000 | Itoh et al. | |
| 6,144,576 A | 11/2000 | Leddige et al. | |
| 6,148,364 A | 11/2000 | Srinivasan et al. | |
| 6,178,135 B1 | 1/2001 | Kang | |
| 6,256,324 B1 | 7/2001 | Voloshin | |
| 6,304,921 B1 | 10/2001 | Rooke | |
| 6,317,350 B1 | 11/2001 | Pereira et al. | |
| 6,317,352 B1 | 11/2001 | Halbert et al. | |
| 6,317,812 B1 | 11/2001 | Lofgren et al. | |
| 6,438,064 B2 | 8/2002 | Ooishi | |
| 6,442,098 B1 | 8/2002 | Kengeri | |
| 6,442,644 B1 | 8/2002 | Gustavson et al. | |
| 6,535,948 B1 | 3/2003 | Wheeler et al. | |
| 6,584,303 B1 | 6/2003 | Kingswood et al. | |
| 6,594,183 B1 | 7/2003 | Lofgren et al. | |
| 6,601,199 B1 | 7/2003 | Fukuda et al. | |
| 6,611,466 B2 | 8/2003 | Lee et al. | |
| 6,658,509 B1 | 12/2003 | Bonella et al. | |
| 6,658,582 B1 | 12/2003 | Han | |
| 6,680,904 B1 | 1/2004 | Kaplan et al. | |
| 6,715,044 B2 | 3/2004 | Lofgren et al. | |
| 6,718,432 B1 | 4/2004 | Srinivasan | |
| 6,732,221 B2 | 5/2004 | Ban | |
| 6,754,807 B1 | 6/2004 | Parthasarathy et al. | |
| 6,763,426 B1 | 7/2004 | James et al. | |
| 6,799,235 B2 | 9/2004 | Bormann et al. | |
| 6,807,103 B2 | 10/2004 | Cavaleri et al. | |
| 6,816,933 B1 | 11/2004 | Andreas | |
| 6,850,443 B2 | 2/2005 | Lofgren et al. | |
| 6,853,557 B1 | 2/2005 | Haba et al. | |
| 6,853,573 B2 | 2/2005 | Kim et al. | |
| 6,928,501 B2 * | 8/2005 | Andreas et al. | 710/110 |
| 6,944,697 B2 | 9/2005 | Andreas | |
| 6,950,325 B1 | 9/2005 | Chen | |
| 6,967,874 B2 | 11/2005 | Hosono | |
| 6,996,644 B2 | 2/2006 | Schoch et al. | |
| 7,032,039 B2 | 4/2006 | DeCaro | |
| 7,218,559 B2 * | 5/2007 | Satoh | 365/200 |
| 2002/0188781 A1 | 12/2002 | Schoch et al. | |
| 2003/0074505 A1 | 4/2003 | Andreas et al. | |
| 2003/0088655 A1 * | 5/2003 | Leigh et al. | 709/223 |
| 2003/0128702 A1 | 7/2003 | Satoh et al. | |
| 2003/0174075 A1 | 9/2003 | Iwata | |
| 2004/0001380 A1 | 1/2004 | Becca et al. | |
| 2004/0019736 A1 | 1/2004 | Kim et al. | |
| 2004/0024960 A1 | 2/2004 | King et al. | |
| 2004/0039854 A1 | 2/2004 | Estakhri et al. | |
| 2004/0199721 A1 | 10/2004 | Chen | |
| 2004/0230738 A1 | 11/2004 | Lim et al. | |
| 2005/0160218 A1 | 7/2005 | See et al. | |
| 2005/0213421 A1 | 9/2005 | Polizzi et al. | |
| 2006/0050594 A1 | 3/2006 | Park | |
| 2007/0076479 A1 | 4/2007 | Kim et al. | |
| 2007/0083701 A1 | 4/2007 | Kapil | |
| 2007/0234071 A1 | 10/2007 | Pyeon | |
| 2007/0260764 A1 * | 11/2007 | Summers et al. | 710/9 |

FOREIGN PATENT DOCUMENTS

| | | |
|---|---|---|
| JP | 2003-196230 | 7/2003 |
| JP | 2003-0196230 | 7/2003 |
| JP | 2005-0123685 | 5/2005 |
| JP | 2005-123685 | 5/2005 |
| WO | 01/69411 A2 | 9/2001 |

OTHER PUBLICATIONS

Intel Advanced + Boot Block Flash Memory (C3), : May 2005, Intel Corporation, pp. 1-72.

"256 M × 8 Bit/128M × 16/512MB × 8 Bit NAND Flash Memory", K9K4G08U1M, K9F2G08U0M, K9F2G16U0M, Rev. 1.0, Samsung Electronics Co., Ltd., May 6, 2005, pp. 1-41.

Samsung Electronics Co. Ltd, "256M × 8 Bit / 128 M × 16 Bit / 512M × 8 Bit NAND Flash Memory", K9K4G08U1M, May 6, 2005, pp. 1-41.

64 Megabit CMOS 3.0 Volt Flash Memory with 50MHz SPI, Spansion, pp. 1-22 (2006).

King, et al., "Communicating with Daisy Chained MCP42XXX Digital Potentiometers", Microchip AN747, pp. 1-8, 2001.

M-Systems Flash Disk Pioneers Ltd., "DiskOnChip H1 4Gb (512MByte) and 8Gb (1 GByte) High Capacity Flash Disk with NAND and x2 Technology", Data Sheet, Rev. 0.5 (Preliminary), pp. 1-66, 2005.

Tal, A., "Guidelines for Integrating DiskOnChip in a Host System", AP-DOC-1004, Rev. 1.0, M-Systems Flash Pioneers Ltd., pp. 1-15, 2004.

Samsung Electronics Co. Ltd, OneNAND4G(KFW4G16Q2M-DEB6), OneNAND2G(KFH2G16Q2M-DEB6), OneNAND1G(KFW1G16Q2M-DEB6) Flash Memory, OneNAND™ Specification Ver. 1.2, pp. 1-125, Dec. 23, 2005.

Kennedy, J., et al., "A 2Gb/s Point-to-Point Heterogeneous Voltage Capable DRAM Interface for Capacity-Scalable Memory Subsystems", ISSCC 2004/Session 1/DRAM/11.8, IEEE International Solid-State Circuits Conference, Feb. 15-19, 2004, vol. 1, pp. 214-523.

Kim, Jae-Kwan, et al., "A 3.6Gb/s/pin Simultaneous Bidirectional (SBD) I/O Interface for High-Speed DRAM", ISSCC 2004/Session 22/DSL and Multi-Gb/s I/O 22.7, IEEE International Solid-State Circuits Conference Feb. 15-19, 2004, vol. 1, pp. 414-415.

"HyperTransport TM I/O Link Specification", Revision 2.00, Document No. HTC20031217-0036-00, Hypertransport Technology Consortium, pp. 1-325, 2001.

"IEEE Standard for High-Bandwidth Memory Interface Based on Scalable Coherent Interface (SCI) Signaling Technology (RamLink)", IEEE Std. 1596.4-1996, The Institute of Electrical Electronics Engineers, Inc., pp. i-91, (Mar. 1996).

Oshima, et al., "High-Speed Memory Architectures for Multimedia Applications", Circuits & Devices, IEEE 8755-3996/97, pp. 8-13, Jan. 1997.

Gjessing, S., et al., "RamLink: A High-Bandwidth Point-to-Point Memory Architecture", Proceedings CompCon 1992, IEEE 0-8186-2655-0/92, pp. 328-331, Feb. 24-28, 1992.

Gjessing, S., et al., "Performance of the RamLink Memory Architecture", Proceedings of the Twenty-Seventh Annual Hawaii International Conference on System Sciences, IEEE 1060-3425/94, pp. 154-162, Jan. 1994.

Gjessing, S., et al., "A RAM Link for High Speed", Special Report/Memory, IEEE Spectrum, pp. 52-53, Oct. 1992.

Diamond, S.L., "SyncLink: High: High-speed DRAM for the Future", Micro Standards, IEEE Micro, pp. 74-75, Dec. 1996.

"HyperTransport TM I/O Link Specification", Revision 3.00, Document No. HTC20051222-0046-0008, Hypertransport Technology Consortium, pp. 1-428, Apr. 2006.

"8-megabit 2.5-volt Only or 2.7-volt Only DataFlash®," Technical Specification, Atmel, Rev. 2225H-DFLSH (2004).

Samsung Electronics, "K9XXG08UXM Preliminary Flash Memory," Technical Specification, Samsung Electronics.

"1024K12C™ CMOS Serial EEPROM," Technical Specification, Microchip Technology Inc., (2006).

"The I2C-Bus Specification," Version 2.1, Philips Semiconductors, Jan. 2000.

"16 Mbit SPI Serial Flash," Preliminary Specification, Silicon Storage Technology Inc., (2005).

"2Mbit, Low Voltage, Serial Flash Memory with 40 Mhz SPI Bus Interface," Technical Specification, STMicroelectronics Group of Companies (2005).

"NAND Flash Applications Design Guide," Revision 1.0, Toshiba America Electronics Components, Inc., (Apr. 2003).

* cited by examiner

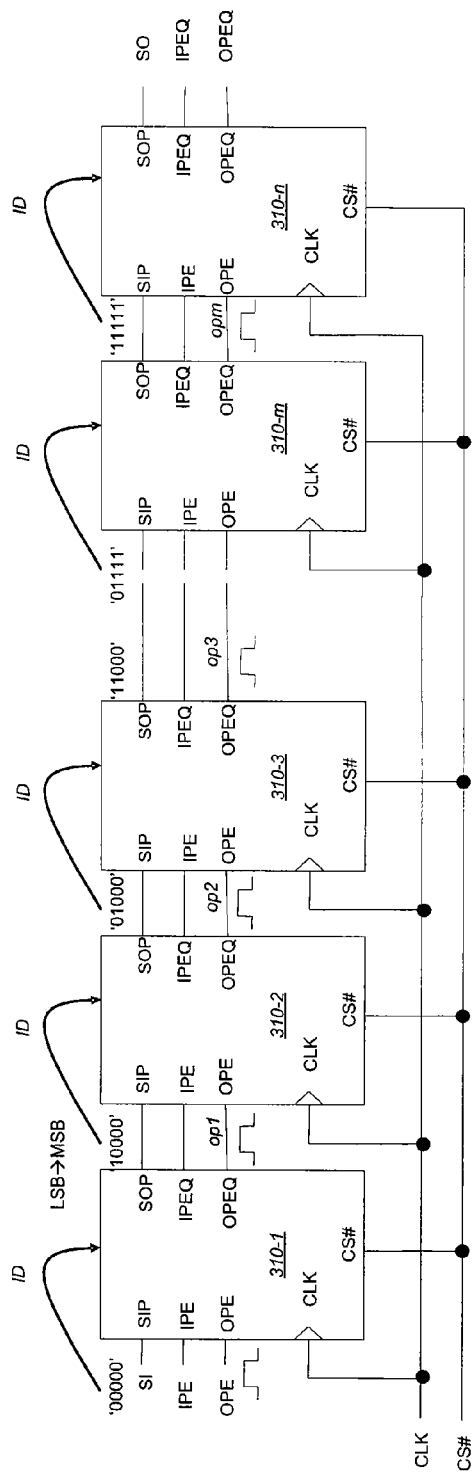
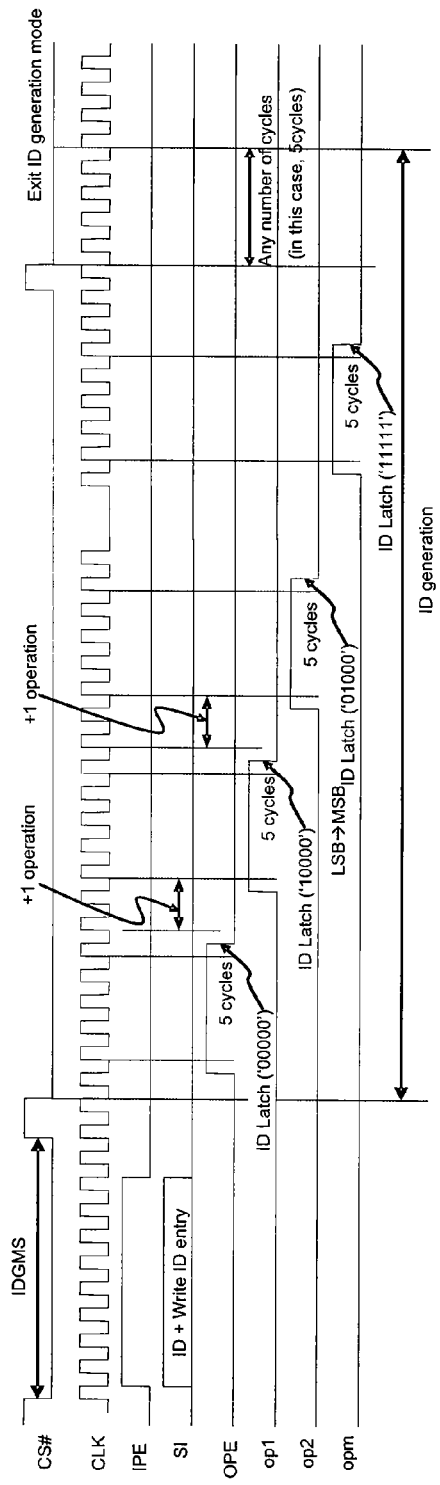
FIG. 3A
FIG. 3B

APPARATUS AND METHOD FOR ESTABLISHING DEVICE IDENTIFIERS FOR SERIALLY INTERCONNECTED DEVICES

CROSS REFERENCE TO RELATED APPLICATIONS

This application claims the benefit of priority of U.S. Provisional Patent Application No. 60/802,645, filed May 23, 2006, and is a continuation-in-part of U.S. patent application Ser. No. 11/521,734 filed Sep. 15, 2006, which claims the benefit of U.S. Provisional Patent Application No. 60/787,710, filed Mar. 28, 2006, all of which are incorporated herein by reference in their entirety.

FIELD OF THE INVENTION

The present invention relates generally to semiconductor device systems. More particularly, the present invention relates to apparatus and method for establishing device identifiers synchronously with a clock signal for a serial interconnection configuration of devices.

BACKGROUND OF THE INVENTION

Today computer-based systems can be found most everywhere and have made inroads into many devices that are used everyday, such as cell phones, handheld computers, automobiles, medical devices, personal computers and the like. In general, society has placed much reliance on computer-based systems to handle everyday tasks, such as simple tasks like balancing checkbooks to relatively complex tasks such as predicting the weather. As technology improves, more and more tasks are migrated to computer-based systems. This, in turn, causes society to become more and more reliant on these systems.

A typical computer-based system comprises a system board and optionally one or more peripheral devices, such as display units and disk units. The system board often contains one or more processors, a memory subsystem and other circuitry, such as serial device interfaces, network device controllers and hard disk controllers.

The type of processors employed on a particular system board usually depends on the type of tasks performed by the system. For example, a system that performs a limited set of tasks, such as monitoring emissions generated by an automobile engine and adjusting an air/fuel mixture to ensure the engine is burning fuel completely, may employ a simple specialized processor that is tailored to performing these tasks. On the other hand, a system that performs many different tasks, such as managing many users and running many different applications, may employ one or more complex processors that are general purpose in nature, configured to perform high-speed calculations and manipulate data to minimize the response time to servicing the users' requests.

The memory subsystem is storage that holds information (e.g., instructions, data values) used by the processors. The memory subsystem typically comprises controller circuitry and one or more memory devices. The controller circuitry is usually configured to interface the memory devices with the processors and enable the processors to store and retrieve information to and from the memory devices. The memory devices hold the actual information.

Like the processors, the type of devices employed in a memory subsystem is often driven by the type of tasks performed by the computer system. For example, a computer system may have the task of having to boot without the assistance of a disk drive and execute a set of software routines that do not change often. Here, the memory subsystem may employ non-volatile devices, such as flash memory devices, to store the software routines. Other computer systems may execute very complex tasks that require a large high-speed data store to hold large portions of information. Here, the memory subsystem may employ high-speed high-density Dynamic Random Access Memory (DRAM) devices to store the information.

Demand for flash memory devices has continued to grow significantly because these devices are well suited in various embedded applications that require non-volatile storage. For example, flash is widely used in various consumer devices, such as digital cameras, cell phones, USB flash drives and portable music players, to store data used by these devices. Market demand for flash memory has led to tremendous improvements in flash memory technology over the past several years both in terms of speed and density. These improvements have led to the prediction that flash memory-based devices may one day replace hard disk drives in applications that continue to use disk drives for mass storage.

Some flash devices employ serial interfaces such as, for example, multiple flash devices, which are used to perform operations, such as read, write and erase operations, on memory contained in the devices. These operations are typically selected on a device using command strings that are serially fed to the devices. The command strings typically contain a command that represents the operation to be selected, as well as other parameters. For example, a write operation may be selected by serially feeding an information string to the device that contains a write command, the data to be written and an address in the memory where the data is to be written.

The command string may be fed to all of the devices even though the command may only be performed on one of the devices. To select the device on which the command is to be performed, the command string may contain a device identifier (ID) that identifies the flash device to which the command is directed. Each device receiving the command string compares the device ID contained in the command string to an ID associated with the device. If the two match, the device assumes that the command is directed to the device and performs the command.

A problem with the above-described arrangement involves establishing a device ID for each device. One technique that may be used to establish a device ID for a device is to hardwire an internal unique device ID into the device. A drawback with this approach, however, is that if large volumes of devices are produced, the size of the device ID may have to be quite large in order to ensure that each device contains a unique device ID. Managing a large-sized device ID may add significant complexity to the device, which in turn may increase the cost of producing the device. In addition, reclaiming device IDs that are associated with devices that are no longer in use may further add to the complexity of this scheme.

Another approach to assigning device IDs to devices involves externally hardwiring a device ID for each device. Here, the device ID may be specified by wiring various pins on the device to certain states to establish a device ID for the device. The device reads the wired state of the pins and establishes its ID from the read state. One drawback with this approach, however, is that external wiring is needed to assign the device ID for each device. This may add to the complexity of, e.g., printed circuit boards (PCBs) that hold the memory devices. Another drawback with this approach is that it may require pins to be dedicated for the assignment of the device ID. This may consume precious resources that may be otherwise better used. In addition, dedicating pins for the assignment of the device ID may require a greater footprint for the device than if pins were not used to assign the device ID.

One of the solutions proposed to address the aforementioned limitations of prior art techniques is to automatically establish a device identifier (ID) for a device, for example, in a serial interconnection configuration, in a manner that does not require special internal or external hardwiring of the device ID. Such a technique is taught in related U.S. patent application Ser. No. 11/521,734 filed Sep. 15, 2006, the teachings of which are incorporated herein by reference in their entirety. Briefly, the technique enables the role of Input Port Enable (IPE) signal to change based on the device configuration of single chip, multi-drop, or serial interconnection. The serial input (SI) and serial output (SO) functions can send and receive all data types without timing restriction during relevant operations. There is also no need for additional pin or pin function change from the main pin definition. This ID generation and assignment technique depends on the number of available pins, which are determined by the number of link ports. Therefore, for example, in multi-independent serial link (MISL), for single port, the maximum number of devices supported is eight devices. In the case of dual ports, the maximum number of devices is 64 (i.e., three pins for one port).

SUMMARY OF THE INVENTION

An apparatus and method for establishing device identifiers for a serial interconnection configuration of devices is disclosed. The devices may be, for example, memory devices, such as dynamic random access memories (DRAMs), static random access memories (SRAMs) and flash memories. Such serial interconnection may be implemented in a multi-independent serial link (MISL).

Aspects of the technique enable identifiers to be assigned to devices without requiring additional hard pins on the device for this purpose. Using functional and timing definitions, an identifier of each device is automatically produced by a device that contains related combination logic, such as an adder.

In a first aspect, the present invention provides an apparatus for establishing a device identifier (ID) for a device configured in a serial interconnection configuration having a plurality of devices. The apparatus comprises an ID producer for producing a device ID in response to an input signal received at a serial input of the device, and outputting an output signal associated with a produced device ID through a serial output of the device synchronously with clock.

In one example, the input signal received at the device includes a value associated with the device ID of the device and the produced device ID associated with the output signal includes a value associated with the device ID of another device in the serial interconnection configuration.

In another example, the input signal received at the device includes a value associated with the device ID of a previous device in the serial interconnection configuration and the produced device ID associated with the output signal includes a value associated with the device ID of the device of the serial interconnection configuration.

In a further embodiment, the ID producer comprises: an ID calculator for making an N-bit ID and producing a calculated value based on the N-bit ID and a predetermined number, N being an integer that is one or greater than one; and an ID provider for providing the device ID in accordance with the calculated value.

For example, the ID calculator performs a calculation of adding 1 to the N-bit ID and the addition result is provided as the N-bit ID. Alternatively, the calculation may be performed by subtracting 1 from the N-bit ID and the subtraction result is provided as the N-bit ID.

The technique also provides an apparatus for generating a device identifier (ID) for a device coupled to one of a plurality of devices in a serial interconnection configuration. The device can have at least one cell for storing data, a serial input connection for receiving serial input data and a serial output connection for providing serial output data. The apparatus includes an input registering circuit for registering serial N-bit ID data contained in the serial input data and for providing the registered N-bit ID data as parallel N-bit ID data, N being an integer that is one or greater than one; a calculating circuit for performing a calculation based on the parallel N-bit ID data and given number data to provide N-bit calculation data; and a parallel-serial circuit for registering the N-bit calculation data as parallel N-bit calculated data and for providing the registered parallel N-bit calculated data in as serial N-bit data, the serial N-bit data being forwarded to an input registering circuit included in another generating apparatus coupled to another device.

For example, the device can be a memory device that includes a calculating circuit having a circuit for adding the given number data to the parallel N-bit ID data or subtracting the given number data from the parallel N-bit ID data to generate a new ID.

For example, the adding circuit or subtracting circuit can include an N-bit adder or subtractor, which performs parallel addition or subtraction. The parallel added or subtracted data is fed to an N-bit parallel-to-serial register, which in turn provides serial ID data that is transferred to another memory device.

The apparatus can include a selector that selects the serial N-bit data to be forwarded to another generating apparatus coupled to another memory device, in response to an ID generation enabling signal. The ID generation enabling signal may be generated in accordance with commands included in the serial input data. The selector may select data derived from the cell for storing data in the memory device and forwarding the data to the other memory device, in accordance with the status of the ID generation enabling signal.

In a further aspect, the present invention provides a device configured in a serial interconnection configuration of a plurality of devices, the device comprising a device identifier (ID) establisher for establishing a device ID for the device. The device ID establisher includes an ID generator for: generating a device ID in response to an input signal received at a serial input of the device; and outputting an output signal associated with a generated device ID through a serial output of the device synchronously with clock.

In another aspect, the present invention provides a serial interconnection configuration of a plurality of devices. Each of the devices comprises: a serial input and serial output for, respectively, receiving an input signal and transferring an output signal; a clock input for receiving a clock signal; and a device identifier (ID) establisher for establishing a device ID for the device, the device ID establisher having an ID generator for generating a device ID in response to the input signal received at the serial input of the device, the output signal being associated with a generated device ID through the serial output of the device synchronously with clock.

In yet another aspect, the present invention provides a method for establishing a device identifier (ID) for a device configured in a serial interconnection configuration having a plurality of devices. The method comprises: generating a device ID in response to a serial input signal; and outputting a signal associated with the device ID through a serial output of the device. The generating and transferring are synchronous with clock.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 3A and 3B are, respectively, a block diagram of devices employing an example of ID generation logic for single link and a timing diagram of signals for the memory devices;

DETAILED DESCRIPTION

Generally, the present invention provides a system including a number of devices in a serial interconnection configuration. An apparatus and a method for establishing device identifiers for a serial interconnection configuration of devices are disclosed. Such serial interconnection may be implemented in a multi-independent serial link (MISL).

The method and apparatus in accordance with the techniques described herein may be applicable to a memory system having a plurality of devices in a serial interconnection. The devices may be, for example, memory devices, such as dynamic random access memories (DRAMs), static random access memories (SRAMs) and flash memories.

In conventional memory devices, ID assignment is typically performed using additional pins to make a logic combination, such as (0000), (0001), . . . , (1111). Assigning IDs in this manner typically means that pin assignment should be mandatory to cover the connection.

Serializing commands and data applied to a memory device enables fewer pins to be employed to perform various functions associated with the device. ID assignment to a particular memory device may be performed using serial input enable and output enable signal ports associated with the device. Here, a number associated with the device's ID may be transferred and incremented by one into each device serially. No complicated timing need be generated. Entry timing and exit timing may be used for the ID write operation of device.

Generally, aspects of the present invention provide a method and a device controller for establishing a device identifier (ID) for a device configured in a serial interconnection configuration having a plurality of devices, the device controller comprising: an ID generator for generating a device ID associated with a first device in response to an input signal received at a serial input of the first device, and transferring an output signal associated with the device ID to a second device in the serial interconnection configuration through a serial output of the first device synchronously with a clock signal, as described in detail below.

With reference to the figures, embodiments of the present invention will be described. In the following description, the same reference signs will be used for signals and input and output connections. For example, reference sign CLK represents a clock signal and a clock input connection; IPE represents an input port enable signal and an input port enable input connection of a device; OPE represents an output enable signal and an output port enable connection of a device; CS# represents a chip select signal and a chip select input connection; IPEQ represents an input port enable output connection of a device and an input port enable output signal; and OPEQ represents an output port enable output connection of a device and an output enable output signal.

Figure 1A:
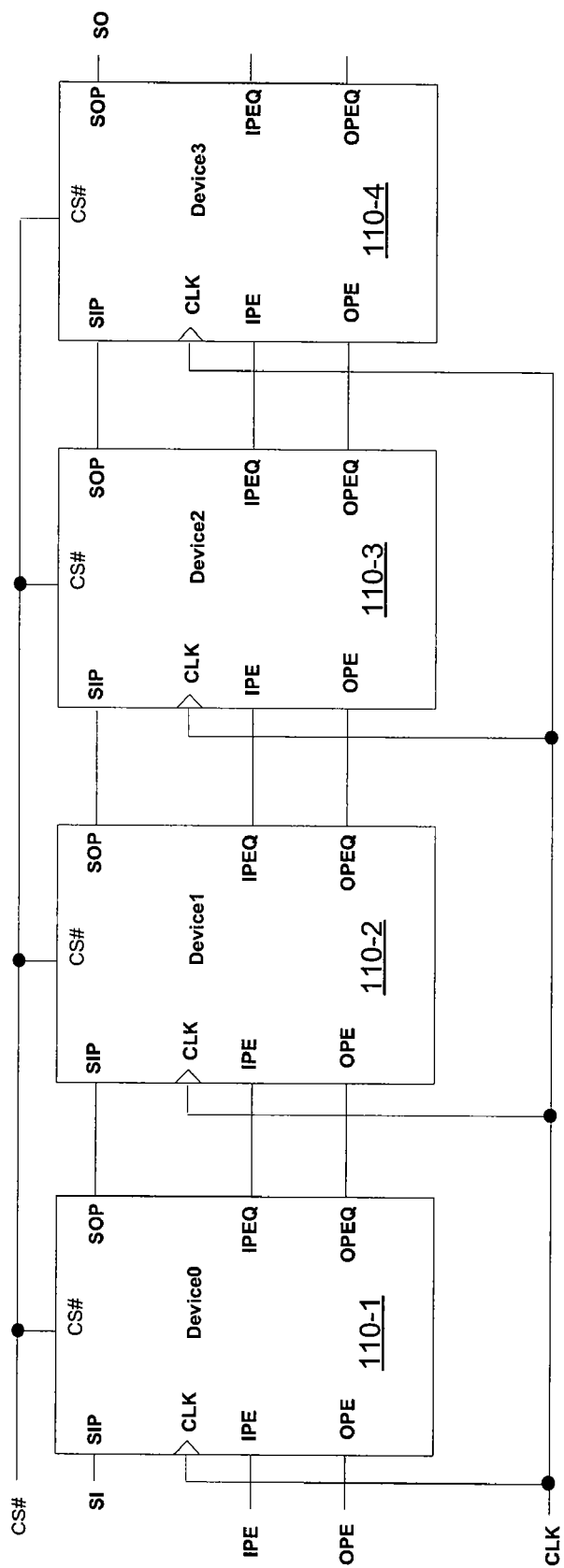
FIG. 1A is a block diagram of a device configuration comprising a plurality of single port devices configured in a serial interconnection configuration, in which embodiments of the present invention may be implemented.

FIG. 1A shows an exemplary device configuration including a plurality of single port devices configured in a serial interconnection configuration having inputs and outputs for various signals. In this particular example, the device configuration includes four devices 0, 1, 2, and 3 (110-1, 110-2, 110-3, and 110-4). Each of the interconnected devices 110-1-110-4 has the same structure. A memory controller (not shown) provides a group of signals containing chip select CS#, serial input (SI), input port enable (IPE), output port enable (OPE)_, clock CLK, and other control and data information (not shown) that are provided to the devices. A memory system may include such a serial interconnection configuration of devices and a memory controller for controlling operations of the serially interconnected devices.

Figure 1B:
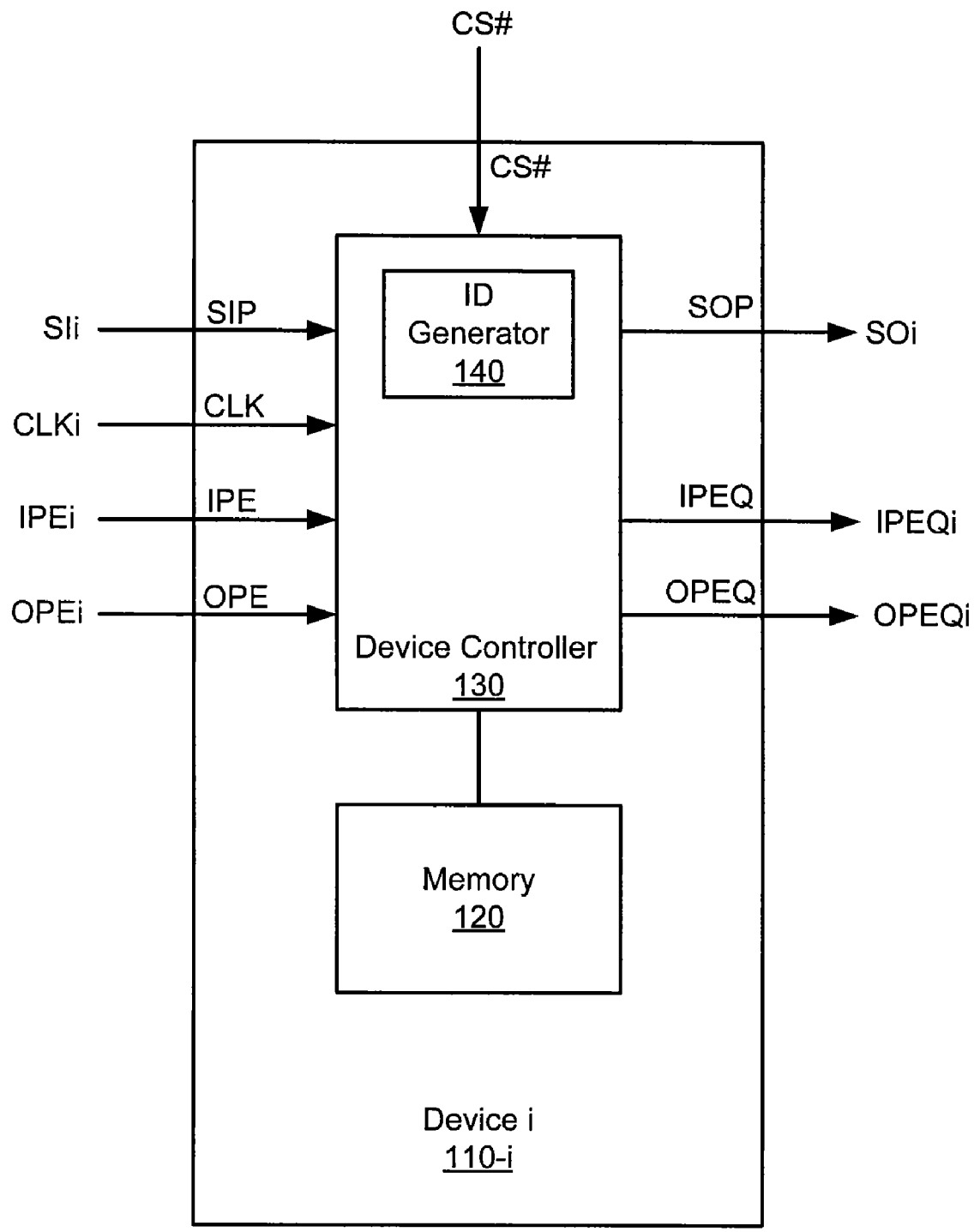
FIG. 1B is a block diagram illustrating one of the devices shown in FIG. 1A.

FIG. 1B shows one device 110-$i$ representing any one of the devices 110-1-110-4 shown in FIG. 1A. The device 110-$i$ includes a device controller 130 and a memory 120 including such as, for example, random access memory or Flash memory. For example, the random access memories can be dynamic random access memory (DRAM), static random access memory (SRAM), magnetoresistive random access memory (MRAM) and the Flash memories can be NAND-type, NOR-type, AND-type, and other types of Flash memories. The device controller 130 has a device identifier (ID) generator 140. The device 110-$i$ has a serial input port (SIP) connection, a serial output port (SOP) connection, a chip select input (CS#), and a clock input (CLK). The SIP is used to transfer information (e.g., command, address and data information) into the device 110-$i$. The SOP is used to transfer information from the device 110-$i$. The CLK input receives a clock signal. The CS# input receives a chip select signal CS#, which enables operations at all devices simultaneously. The device controller 130 performs various control and process functions with access to the memory 120 in response to the input signals (e.g., SI, IPE, OPE, CLK), and provides serial output data to the next device 110-($i$+1).

Referring to FIGS. 1A and 1B, the SIP and the SOP are connected between devices in the serial interconnection configuration such that the SOP of previous device 110-($i$−1) in the serial interconnection is coupled to the SIP of the device 110-$i$ in the serial interconnection. For example, the SOP of device 1, 110-1, is coupled to the SIP of device 2, 110-2. The CLK input of each of four devices 110-1-110-4 is fed with the clock signal CLK from the memory controller (not shown). The clock signal CLK is distributed to all devices via a common link. As will be described further below, the clock signal CLK is used to, inter alia, latch information input to the device 110-$i$ at various registers contained therein. The CS# input is a conventional chip select input for selecting the device. The CS# input is coupled to a common link, which enables the chip select signal CS# to be asserted to all of the devices 110-1-110-4 concurrently and consequently selects all of the devices.

In addition, the device 110-$i$ has an input port enable (IPE) input, an output port enable (OPE) input, an input port enable output (IPEQ) and an output port enable output (OPEQ). The IPE is used to input the input port enable signal IPEi to the device 110-$i$. The signal IPEi is used by the device to enable the SIP such that when the IPE is asserted, information is serially input to the device 110-$i$ via the SIP. Likewise, the OPE is used to input the output port enable signal OPEi to the device 110-$i$. The OPEi signal is used by the device to enable the SOP such that when the OPE is asserted, information is serially output from the device 110-$i$ via the SOP. The IPEQ and the OPEQ are outputs that output the IPEQi and OPEQi signals, respectively, from the device 110-$i$. The CS# and the CLK inputs are coupled to separate links which distribute the chip select signal CS# and the clock signal CLK, respectively, to four devices 110-1-110-4, as described above.

The SIP and the SOP are coupled from previous device 110-($i$−1) to next device 110-($i$+1) in the serial interconnection configuration, as described above. Moreover, the IPEQ and the OPEQ outputs of the previous device 110-($i$−1) are coupled to the IPE and the OPE inputs, respectively, of the present device 110-$i$ in the serial interconnection configuration. This arrangement allows the IPE and OPE signals to be transferred from one device to the next (e.g., device 0, 110-1, to device 1, 110-2) in the serial interconnection configuration.

Information transmitted to the devices 110-1-110-4 can be latched at different times of the clock signal CLK fed to the CLK input. For example, in a single data rate (SDR) implementation, information input to the device 110-$i$ at the SIP can be latched at either the rising or falling edge of the clock signal CLK. Alternatively, in a double data rate (DDR) implementation, both the rising and falling edges of the clock signal CLK can be used to latch information input at the SIP.

The configuration of the devices 110-1-110-4 in FIG. 1A includes both a serial interconnection (e.g., input SI and output SO) and conventional multi-drop connections (e.g., CLK and CS#). Thus, the configuration may be referred to as a hybrid of serial interconnection and multi-drop configurations, where the advantages of each may be realized.

The ID generator 140 generates an ID to establish a device ID for the device in the serial interconnection configuration.

Figure 2A:
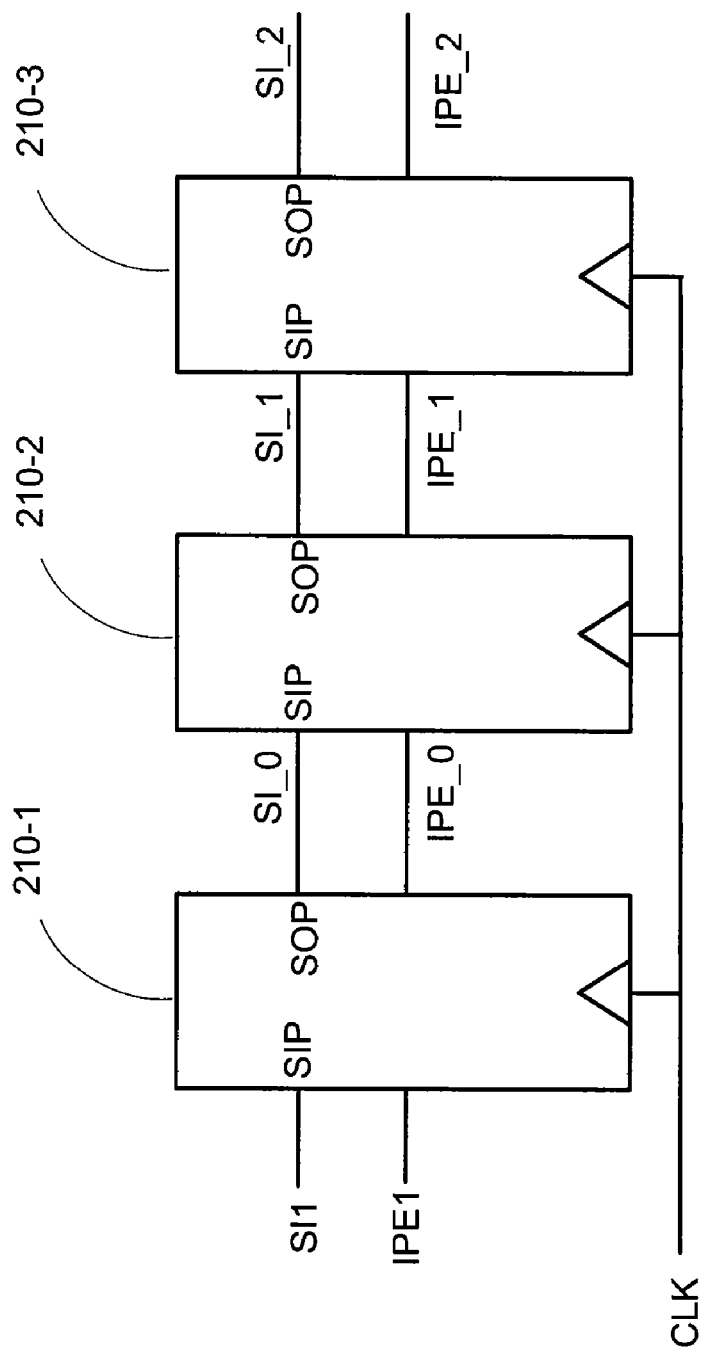
FIG. 2A is a block diagram illustrating communications between devices configured in a serial interconnection configuration.
Figure 2B:
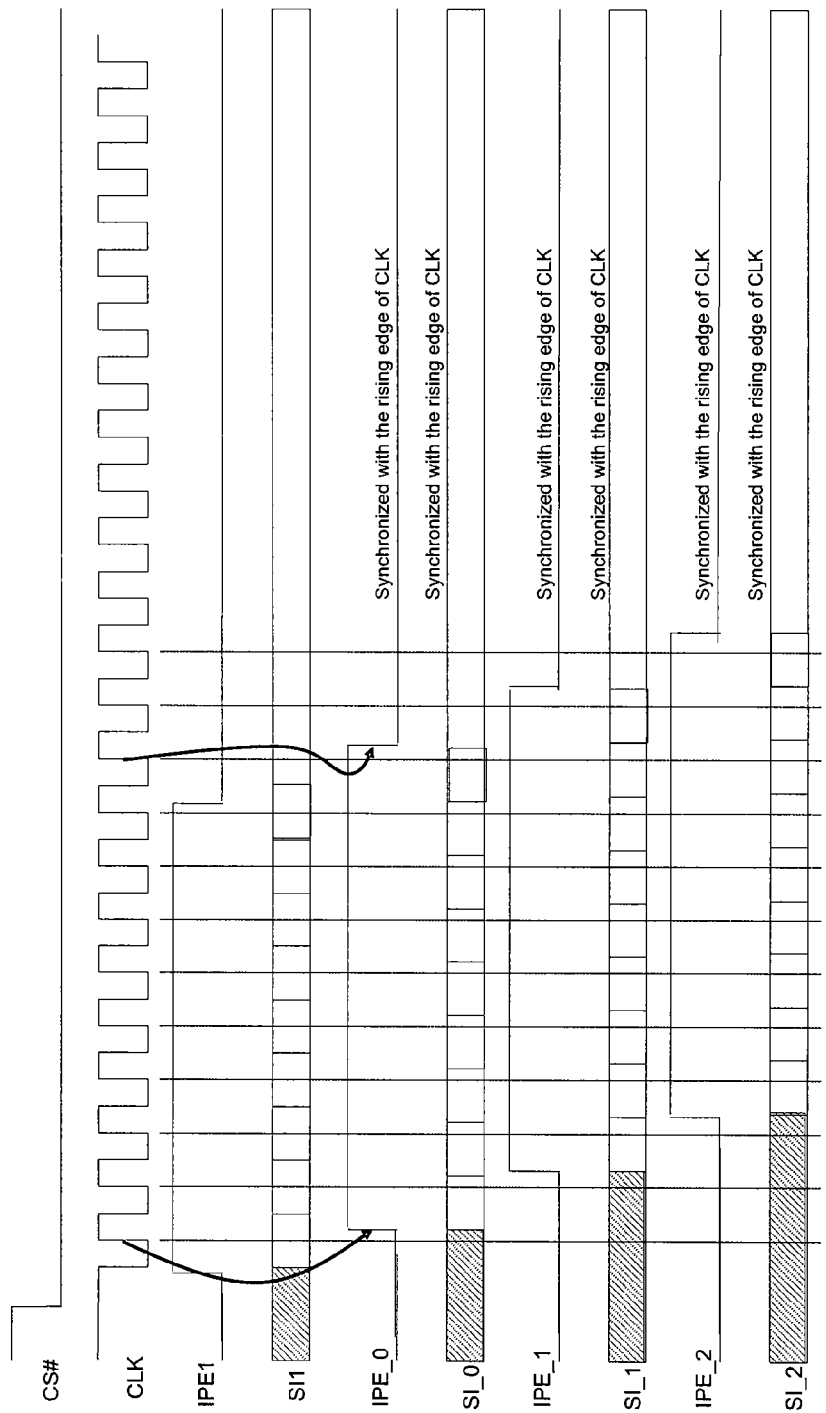
FIG. 2B is a timing diagram illustrating communication between devices configured in the serial interconnection configuration as shown in FIG. 2A.

FIGS. 2A and 2B illustrate three devices 210-1-210-3 configured in a serial interconnection with an accompanying timing diagram showing signals transferred between the devices. A chip select signal CS# (not shown) is first asserted to select the devices. Information is transmitted to the first device 210-1 in the serial interconnection by asserting IPE and clocking data into the device 210-1 on successive rising edges of the clock signal CLK. An input port enable signal IPE is propagated through the first device 210-1 to the second device 210-2 in less than a cycle, as shown by signal IPE_0. The propagation enables information to be clocked from the SOP of the first device 210-1 to the SIP input of the second device 210-2 at one cycle after the information was clocked into the first device 210-1. This process is repeated for successive devices in the serial interconnection. For example, information is inputted to the third device 210-3 in the serial interconnection at the third rising edge of the clock signal CLK from the latch point of the data at the first device 210-1. Control signals IPE_0, IPE_1, IPE_2 are synchronized with the rising edge of the signal CLK in order to ensure a proper setup time for these signals at the next device in the serial interconnection configuration.

Figure 4A:
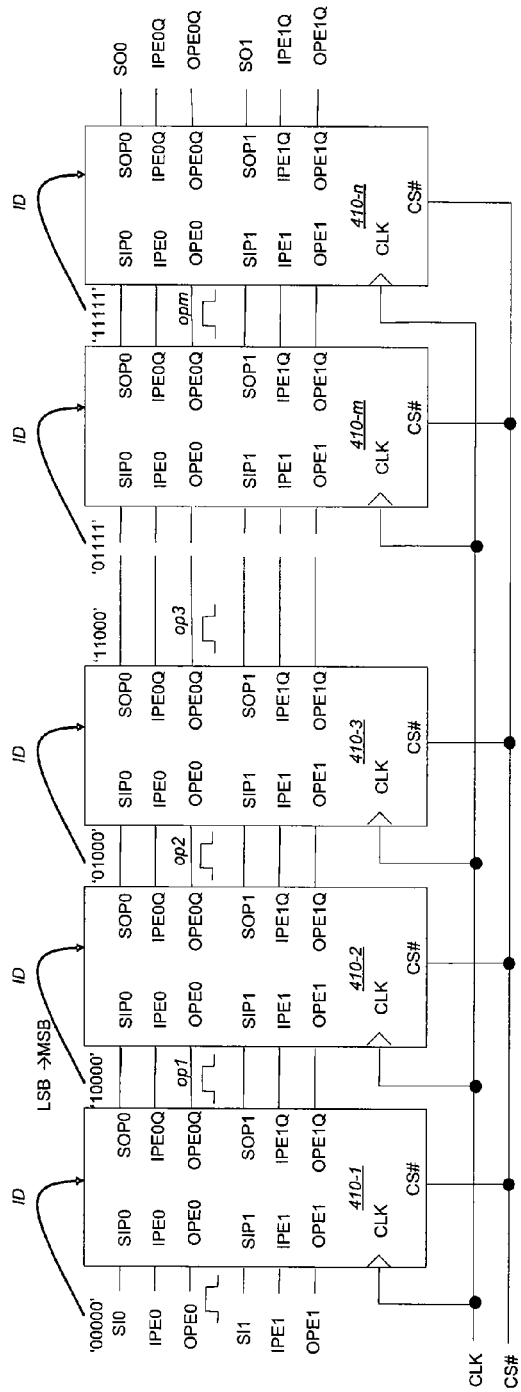
FIGS. 4A and 4B, are, respectively, a block diagram of devices employing an example of ID generation logic for dual link and a timing diagram of signals for the devices.
Figure 4B:
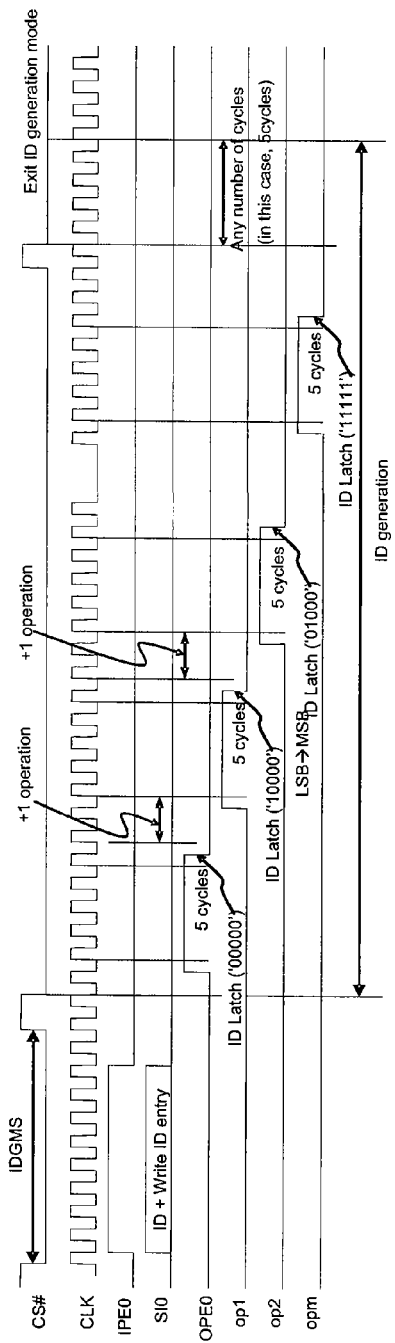

FIGS. 3A and 4A illustrate exemplary operations to generate device identifiers (IDs) for memory devices in a serial interconnection configuration for single and dual links, respectively. FIG. 3A depicts devices 310-1-, 310-$m$ and 310-$n$ connected in a single link arrangement and FIG. 3B depicts signal timings for the devices shown in FIG. 3A. Similarly, FIG. 4A depicts devices 410-1-, 410-$m$ and 410-$n$ connected in a dual link arrangement and FIG. 4B depicts signal timings for the devices shown in FIG. 4A. Here, n is an integer greater than one and m is (n−1). In the particular examples shown in FIGS. 3A and 4A, each of the devices includes a device controller having an ID generator that is similar to that of FIG. 1B.

This exemplary operation generates device IDs using two inputs of a serial interconnection, the SIP and SOP inputs, and can be adapted for use with other ports in a serial interconnection, where a first input receives a serial input and a second port receives a control signal. The ID generation techniques are not limited to MISL application and can be applicable to any serial connection configurations (e.g., daisy cascading connection) with a plurality of existing input pins, if the serial connection (e.g., a daisy chain) system has a clock.

In this embodiment, the IPE has a function to catch a serial input stream based on the 1 byte unit so that the OPE is chosen to latch a serial ID input stream after the chip select signal CS# is low again. By 'write ID entry' command, the OPE catches an input stream which consists of the same cycles as a total number of ID bits. The ID bits are established by the size of an internal ID register. For example, if the devices have a 12 bit-ID register, the OPE will hold the 'high' state during 12 cycles. A 12-bit device ID allows for a maximum of 4,096 addresses in the serial interconnection. Thus, the present embodiment may accommodate a large number of devices in a serial interconnection configuration, the number not being limited by the number of pins at each device. Further, each device does not require the added complexity of an internal hardwired device ID.

In FIGS. 3B and 4B, an ID generation mode setting period referenced at "IDGMS" is a time interval equivalent to predefined clock cycles corresponding to the ID bit length+eight cycles (command bit length)+an assumed number of serially interconnected devices.

For a signal transfer between the OPE input and the OPEQ output or op1 and op2, a non-overlap time section of more than two cycles should occur to avoid an operation contention caused by an ID increment and data transferring to an adjacent next device. After the OPE is asserted at each device 310-1-310-$n$, latched ID input data is stored in an ID register (e.g. referenced at "516" in FIG. 5A) of the device and increment operation with this input is performed before asserting the OPEQ output. A function of the OPE signal is to determine the number of ID bits from 1 bit to the maximum number of defined bits of the ID register into each memory device. In cases where the number of ID bits and the number of defined bits of the ID register are equal ("fixed ID bit"), the order of the ID bits is irrelevant. However, in all other cases, the signal corresponding to device ID should be transferred to the next device in order, beginning with the least significant bit (LSB) and ending with the most significant bit (MSB), reasons for which will be described later.

Figure 5A:
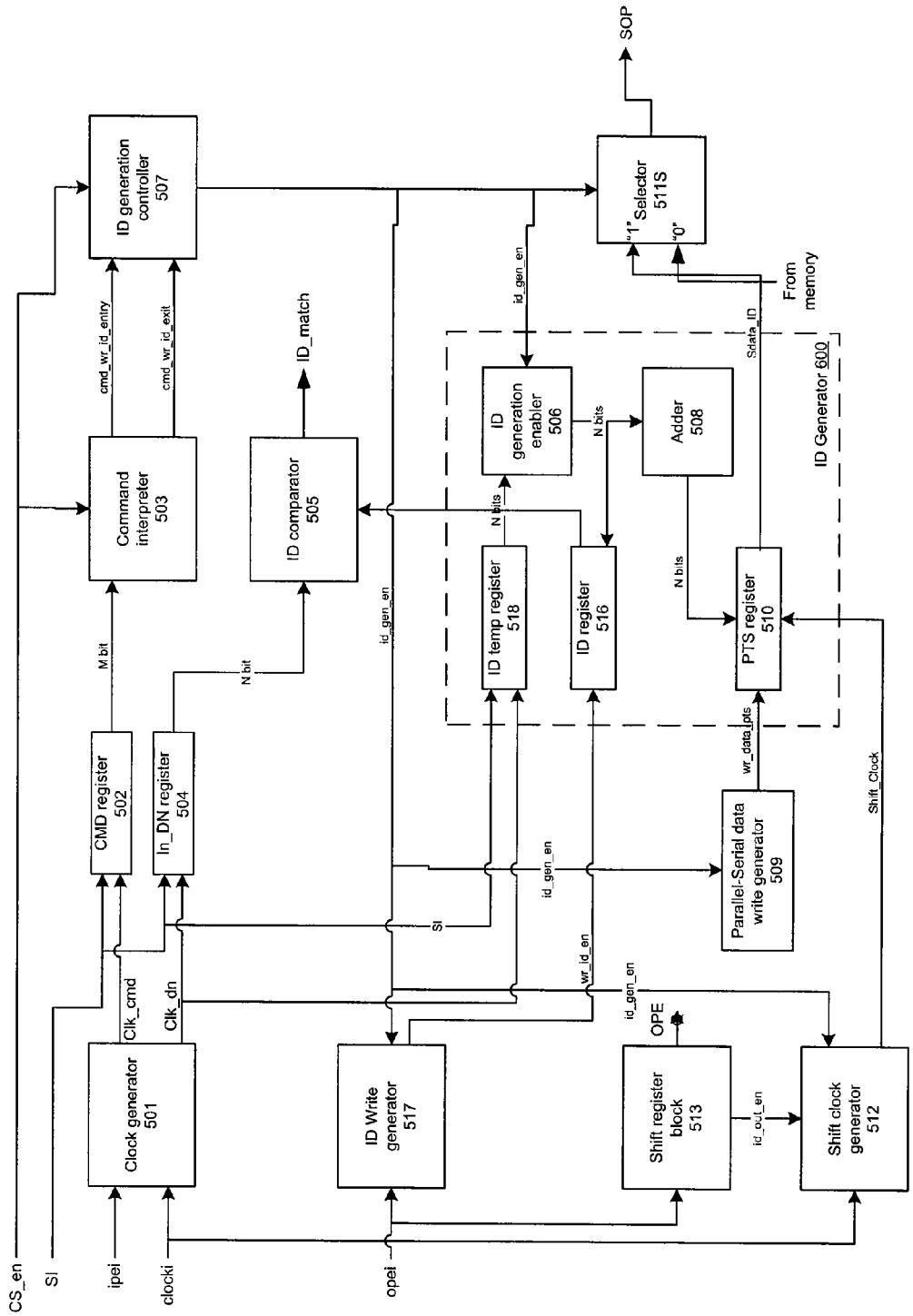
FIG. 5A is a high-level block diagram of logic that can be used to generate an ID for a device according to an embodiment of the present invention.
Figure 5B:
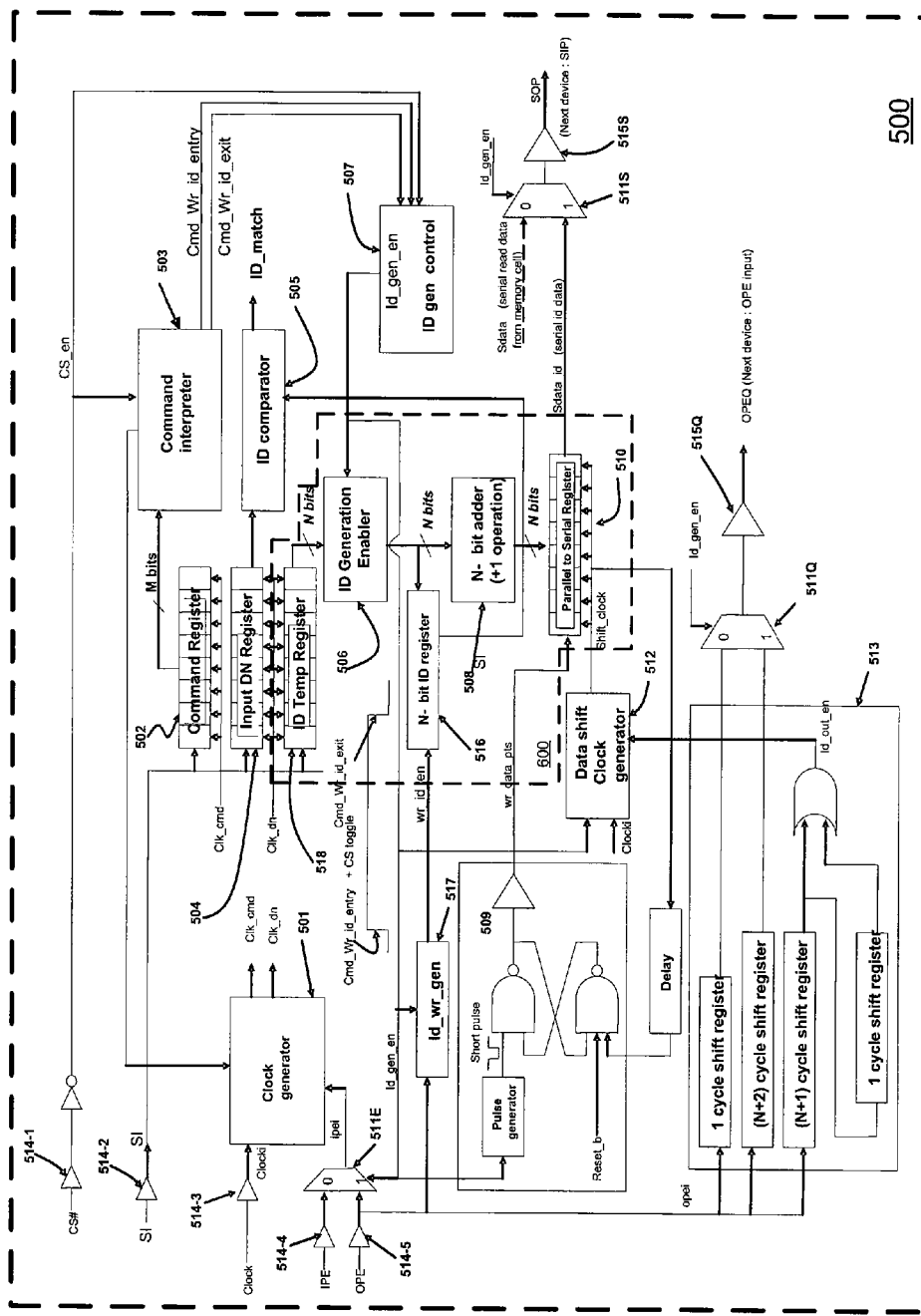
FIG. 5B is a detailed block diagram of the logic shown in FIG. 5A.
Figure 6:
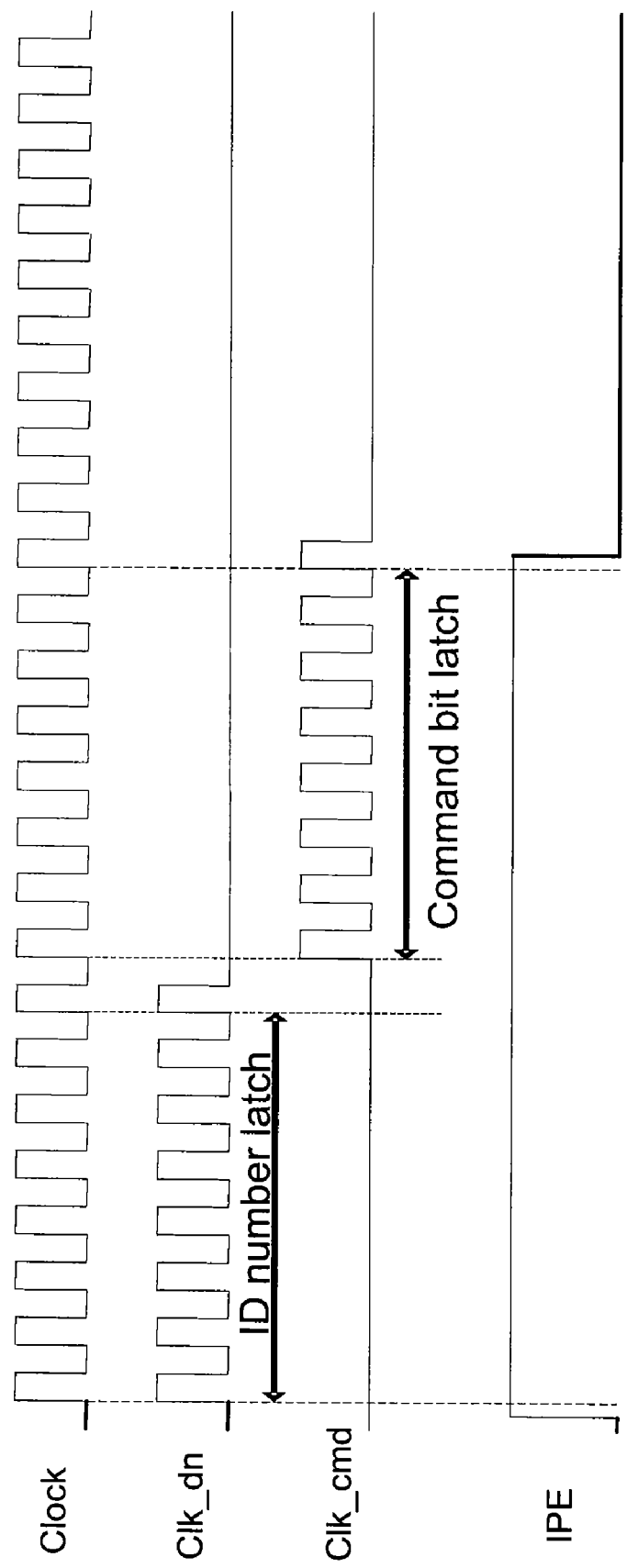
FIG. 6 is an illustration of a timing diagram of clock generation for a device number (DN) register and a command register.

FIGS. 5A and 5B illustrate exemplary logic associated with ID generation of device controller 500 internal to a device 110-$i$ configured in a serial interconnection. A clock generator 501 receives a clock signal fed to the CLK input of the device and provides internal clock signals including "Clk_cmd" and "Clk_dn." The command clock 'clk_cmd' is asserted a number of times equal to the bit length of command serial bits. As shown in FIG. 6, for example, if the memory system has a command of 1 byte unit, the clk_cmd needs 8 clock cycles to latch the serial command bits and then hold latched data until the next command received. The device number (DN) clock 'clk_dn' clocks the ID input, which is stored in input DN register 504 and ID temporary register 518. The sequence of receiving and storing the signals received at the SIP input corresponds to a predefined sequence. For example, the devices may be configured to first receive a signal corresponding to a device ID, followed by receiving command bits. As a result of this order, a number of cycles of clk_dn are generated and then clk_cmd is issued by the clock generator 501.

In order to decode the command bits, serial input command streams are shifted into command register 502 in response to the command clock 'clk_cmd,' and command register 502 in turn sends the registered M-bit command data in parallel to command interpreter 503. The command interpreter 503 is a command decoder and delivers internal command signals that initiate additional controls. Two such command signals (cmd_wr_id_entry, cmd_wr_id_exit) are depicted, and function to start and stop the ID generation mode.

Prior to the ID write generator issuing the command 'write ID entry,' the memory controller (not shown) sends a reset signal to reset inputs of the devices of the serial interconnection configuration. The reset inputs are commonly connected. All devices in the serial interconnection configuration are reset by the reset signal. Upon resetting, all devices are enabled to accept the 'write ID entry' command by default, and all devices have a default ID of 'zero.' As a result, all devices in the serial interconnection can be selected at the same time, and the command 'write ID entry' instructs all devices by having a command 'ID number' of 'zero.'

The input DN register 504 stores input ID data from the previous device. During normal operation (rather than ID generation mode), the input DN register 504 temporarily stores the content of input ID streams from the SIP to be compared with a device ID number in the N-bit ID register 516 (e.g., a 10-bit register). During device ID generation, the input DN register 504 does not receive serial input data. Instead, the ID temporary register 518 catches the serial data and sends it to an ID producer or establiser, exemplified as ID generation enable block 506. The bit number N is an integer that equals the number of bits in the ID number, and can equal any number suitable to identify all devices in the serial interconnection.

The ID comparator 505 functions during normal device operation to identify data and command signals addressed to the device. The comparator 505 compares the ID number of each incoming data at input DN register 504 to the device ID stored in the N-Bit ID register 516, and provides an 'ID_match' signal. If the ID numbers are identical or match, the ID_match signal will equal '1.' Otherwise, it will equal '0'. As a result, each device in the serial interconnection determines whether signals are addressed to it by matching incoming ID number to the device ID stored at each device.

Figure 5C:
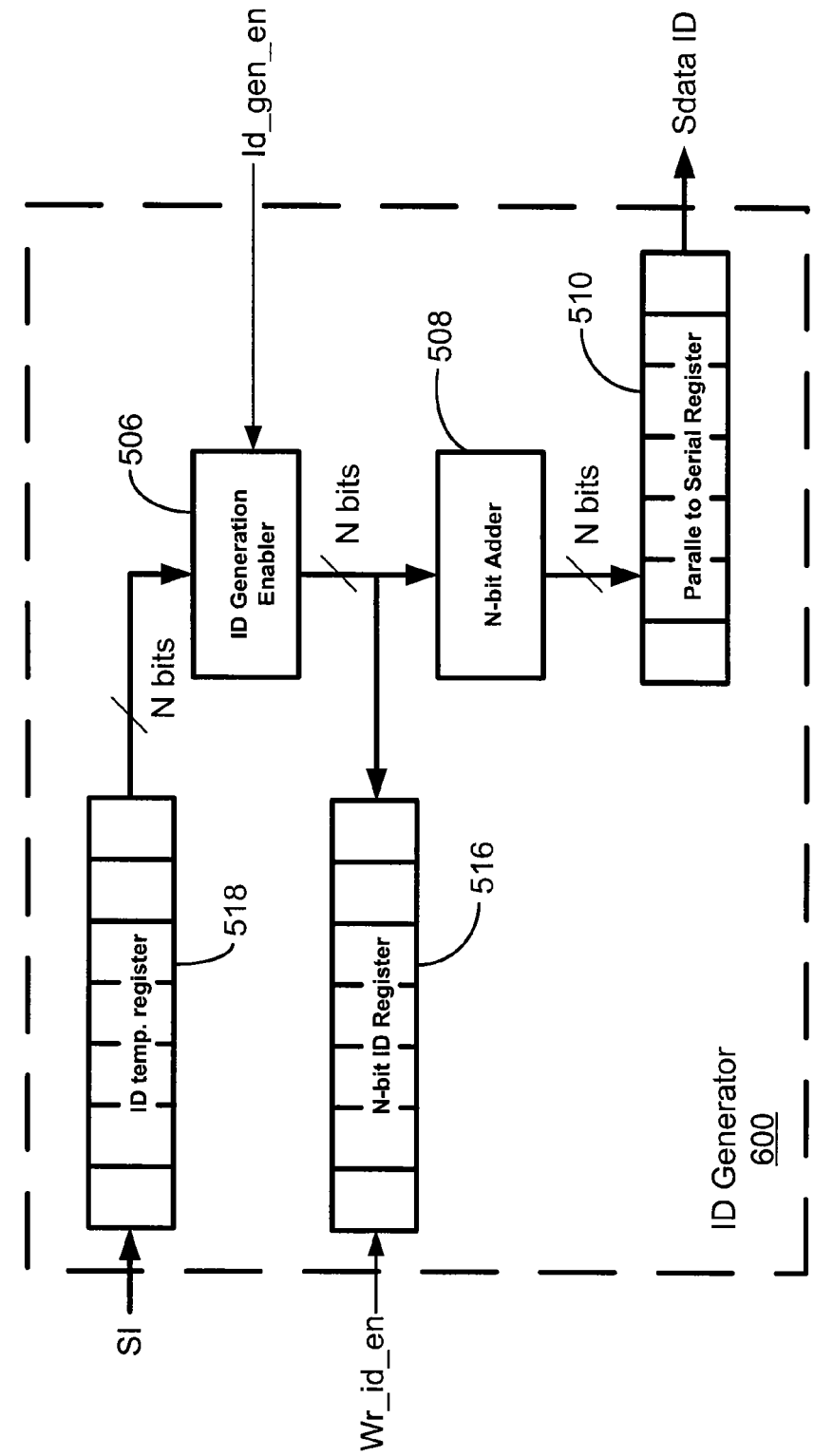
FIG. 5C is a block diagram of an ID generator shown in FIGS. 5A and 5B.
Figure 7:
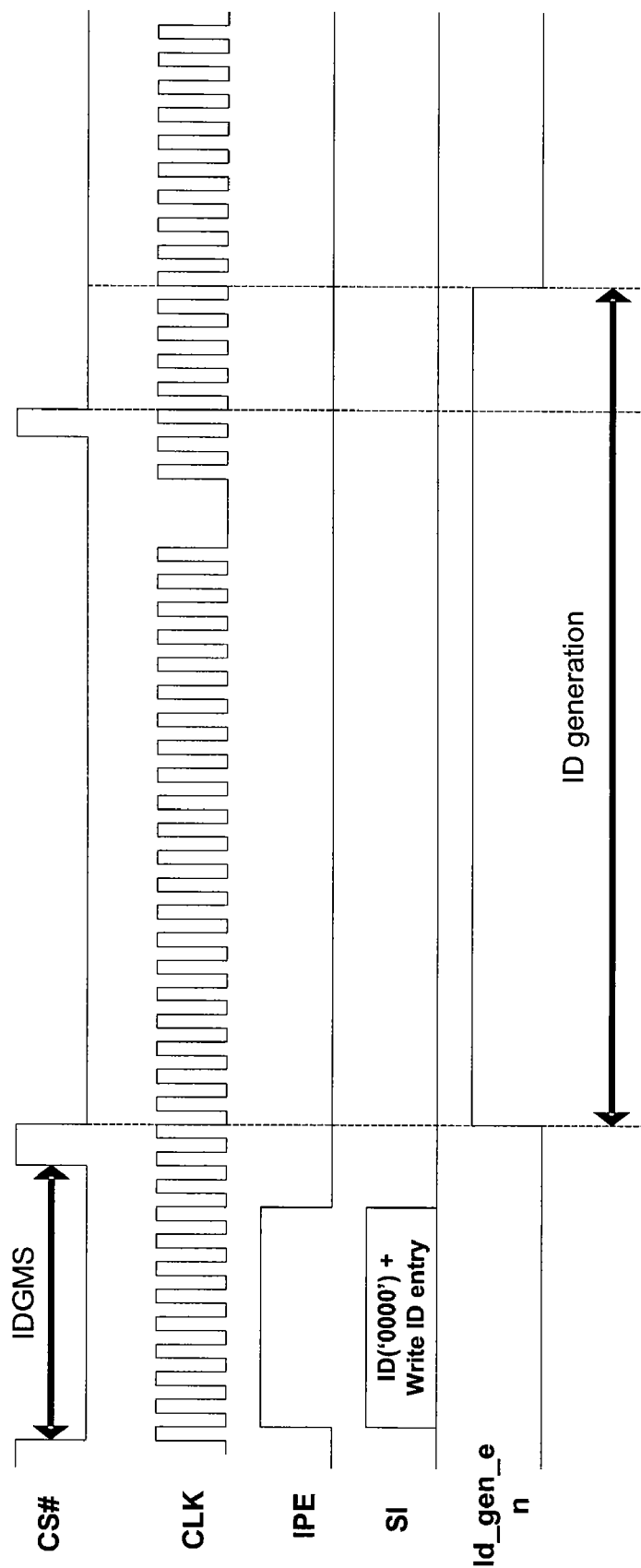
FIG. 7 is an illustration of a timing diagram of an ID generation.

FIG. 5C shows an ID generator 600 of the device controller 500 of FIGS. 5A and 5B. In response to an 'id_gen_en' (ID generation enable) signal from an ID generation controller 507, the ID generation enable block 506 transfers the N-bit inputs of the ID temporary register 518 to the calculator, exemplified as N-bit adder 508 (e.g., a 10-bit adder), and the N-bit ID register 516. Exemplary signal timing for ID generation enable signal is illustrated in FIG. 7. This simultaneous transfer prevents an unnecessary signal transition of the N-bit adder 508 and the N-bit ID register 516. The device ID is stored in the ID register 516 according to the sequence and word length of the device ID. For example, if the N-bit ID register 516 is 10-bits in length and the OPE signal has a 5-cycle high state, then the N-bit ID register 516 stores the 5-bit device ID and a signal corresponding to the 5-bit device ID is transferred to the next device. The remaining bits of the ID register 516 are ignored and thus remain at a value of '0' or 'don't care'.

During the ID generation process, in the above-described example, the N-bit serial input is first stored in the ID temporary register 518 prior to being transferred to the N-bit adder 508 and the N-bit ID register 516. The simultaneous transfer from the temporary register overcomes limitations of serial to parallel (STP) registers. For example, consider a case where the number of ID bits (say, 5 bits) is less than the number of bits of the ID register and adder (say, 10 bits). During the ID generation and assignment process, the five bits (bit 0 (LSB)

to bit 4 (MSB)) are loaded to the first five bits of a STP register and are then provided in parallel to a 10-bit adder. As will be readily apparent to a person skilled in the art, the LSB will be located on bit 4 of the register, which does not correspond to the LSB of the adder. Even if the order of the bits were reversed from MSB (bit 0) to LSB (bit 4), the location of MSB in the STP register will not correspond to the MSB location of the 10-bit adder. Therefore, no matter which bit is assigned as a first bit, conventional STP registers will result in generating erroneous device IDs. This limitation of STP registers is overcome by ensuring that the bits corresponding to the device ID are transferred to the next device in order, beginning with the LSB and ending with the MSB, and storing them in the order received in the ID temporary register (LSB to bit 0 of ID temporary register 518), as will be discussed later in detail with reference to FIGS. 12A and 12B.

The ID generation controller 507 receives the input signals CS# (CS_en), cmd_wr_id_entry, and cmd_wr_id_exit, and transmits the 'id_gen_en' signal, which begins the ID generation mode. The 'id_gen_en' signal is asserted, for example, when the signal CS# is toggled from low to high and low again (see FIG. 7), while the signal cmd_wr_id_entry is asserted simultaneously. It is noted that 'id_gen_en' can be asserted with any other transition of the signal CS# as will be apparent to persons skilled in the art.

Figure 8:
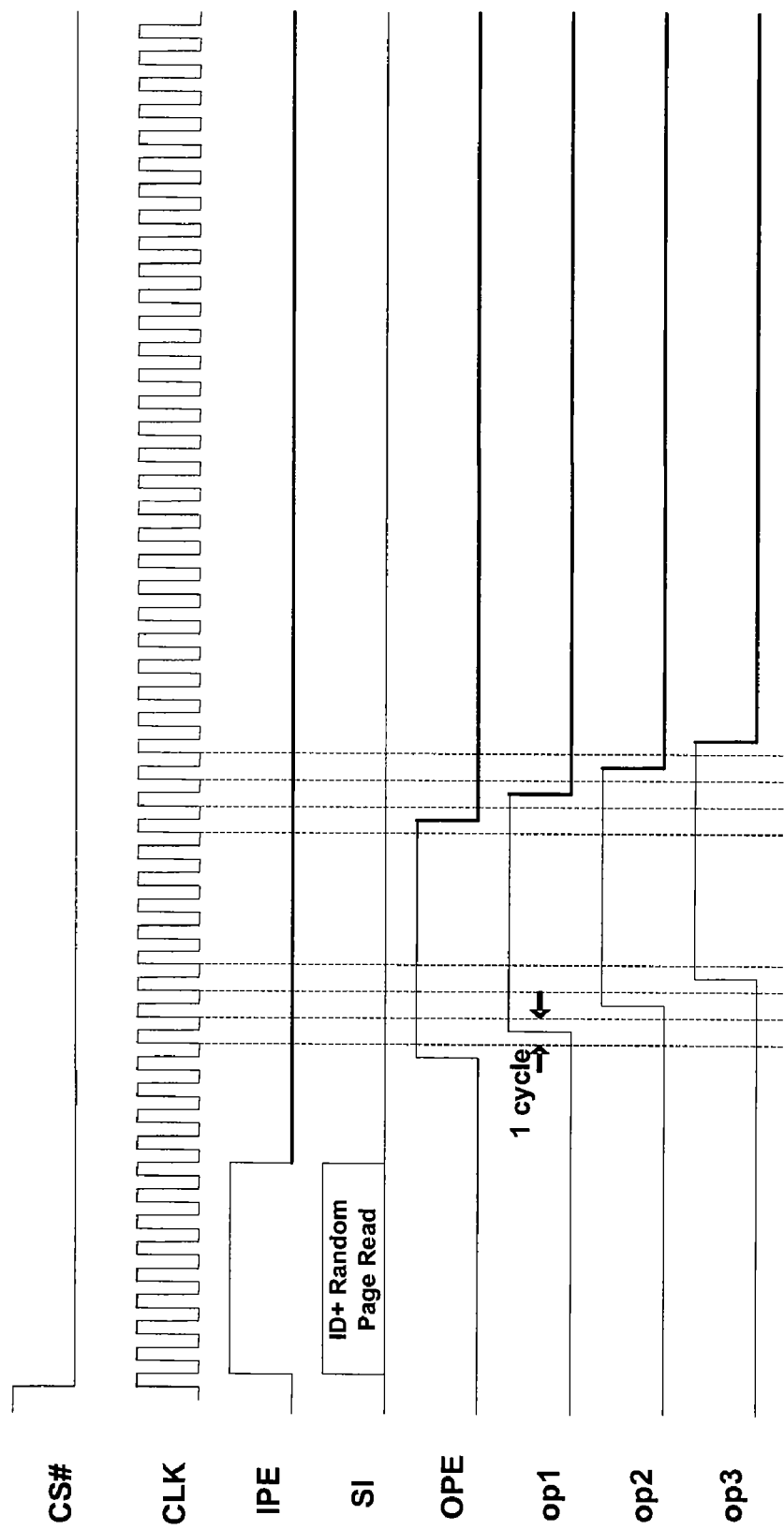
FIG. 8 is an illustration of a timing diagram of latency in the normal operation mode.

FIG. 8 shows latency in the normal operation. Basically, MISL has a one-cycle latency between two adjacent devices. However, 'write ID entry' command makes a change of the path from 1 cycle latency to 'ID bits (ID register bit size)+2 cycles', as shown in FIG. 9A described below.

Figure 9A:
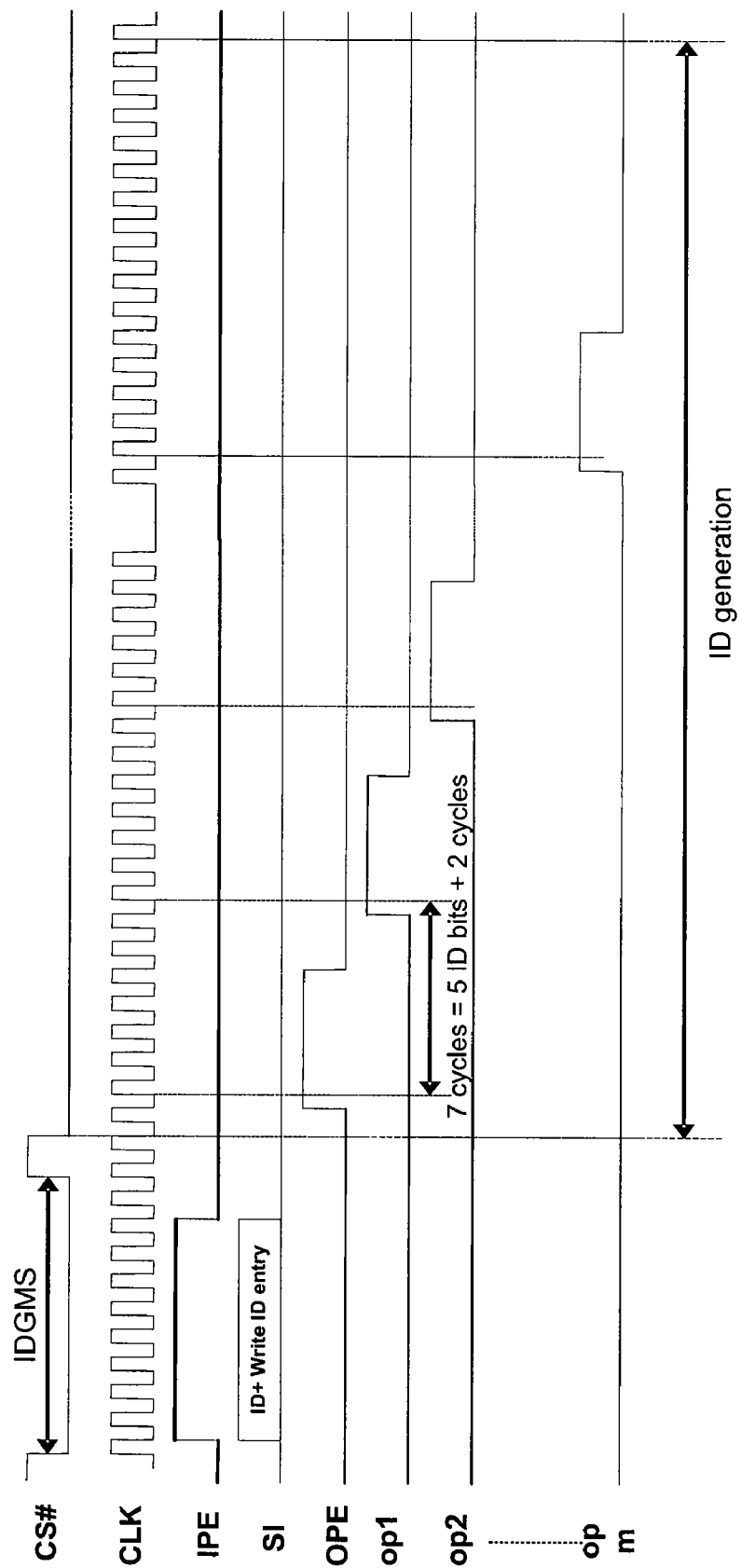
FIG. 9A is an illustration of a timing diagram of ID generation controlled by an output port enable signal.
Figure 9B:
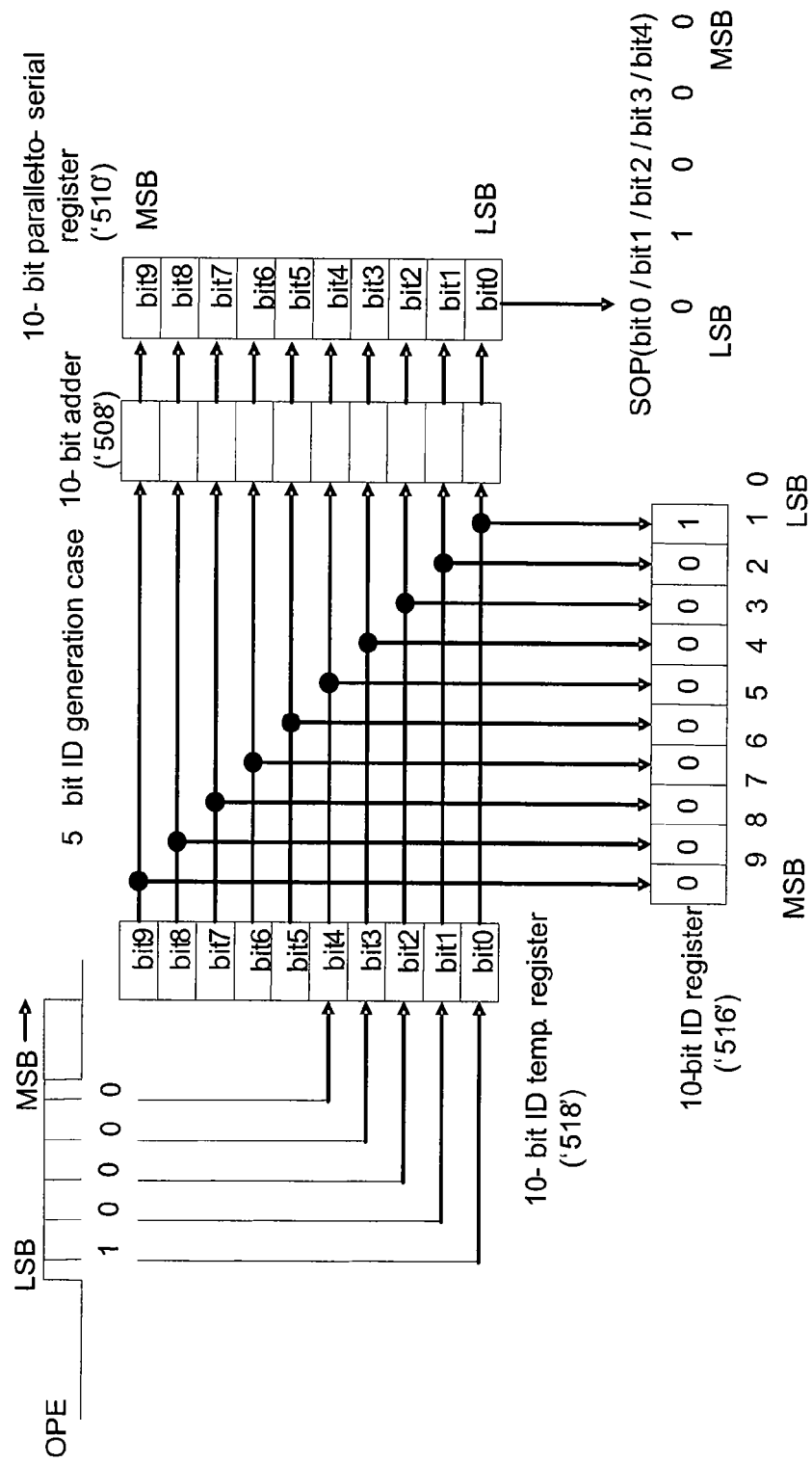
FIG. 9B is an illustration of an ID bit length control by the output port enable signal.

FIGS. 9A and 9B illustrate logic and signal timing of an ID generation control by the output port enable (OPE) signal. Under this operation, the ID bit length can be determined by the length of the OPE signal high, and can be adapted to a serial interconnection configuration including different numbers of devices. The function of the OPE signal is described below with reference to FIGS. 5A, 5B and 5C. Alternatively, the OPE signal is not required to determine ID bit length, and can instead be determined by a predetermined value, bit size of the ID register 516, or by a value associated with another signal.

In FIG. 9B, the 10-bit ID temporary register 518, the 10-bit ID register 516, the 10-bit adder 508 and the ID provider, exemplified as a 10-bit parallel-to-serial register 510, are shown during generation of a 5-bit device ID. The function of these registers is described below with reference to FIGS. 5A, 5B and 5C. The maximum device ID number is determined by the bit size of the internal adder 508 and parallel-to-serial register 510. Further, the device ID number reflects the maximum number of devices that can be connected in the serial interconnection configuration. For example, a 10-bit device ID permits up to 1024 devices to be connected in a single serial interconnection fashion on the serial bus.

Alternatively, the OPE input may also be configured to capture the input data stream of ID number of the previous device, rather than of IPE. This additional function of the OPE input provides simple timing for ID generation mode. In one implementation relating to FIGS. 3A and 4A, after 'write ID entry' is asserted and the chip select signal CS# is toggled from "low" to "high" to "low" as shown in FIGS. 3B and 4B, the OPE is asserted at a high state for a time equal to the bit length of the ID register incorporated in each memory device.

Referring to FIGS. 5A-5C and 9B, an ID write generator 517 generates a 'wr_id_en' signal, which latches the output of the ID generation enable block 506 into the N-bit ID register 516 in the ID generation mode. This signal is set by the falling edge of the OPE signal.

The N-bit adder 508, which is a static adder, performs an adding operation of the input of the ID generation block 506 and a fixed integer, for example, "+1" as shown in FIG. 5A. For example, if N equals 8, the adder may calculate the sum of the 8-bit number from the ID temporary register 518 and the integer '10000000' (in order from LSB to MSB). As a result, the adder 508 produces the next number in a sequence of device ID numbers. The adder 508 may be replaced with other logic circuitry that executes same '+1' operation. Moreover, the logic 500 may be configured to perform other operations on the N-bit number, such as subtraction (as will be described later) or addition of other integers, in order to generate a successive device ID.

The resulting ID data is written to the parallel-to-serial register 510, and is then transferred to the next device through the SOP output of the device as a serial signal. The serial ID number can be used by the next device as its device ID, or may be manipulated by the next device to generate its device ID. Alternatively, the logic may include additional operations to alter the serial ID number, provided that the resulting value is associated with the device ID stored in the N-bit ID register 516.

In the parallel to serial register 510, an input is sent in a parallel form and its output is sent in a serial form. In response to the 'id_gen_en' signal from the ID generation controller 507, a parallel-serial data write generator 509 provides a 'wr_data_pts' signal which activates a parallel input path of the parallel to serial register 510. Its path is disabled after the rising edge of the first clock cycle of the shift_clock with some amount of delay to send the ID data serially through the SOP. The LSB bit is the first bit that is sent and the MSB is the last bit that is sent.

A selector (e.g., a multiplexer) 511S selects one of the two paths in response to the id_gen_en signal. If id_gen_en is zero, that is, normal operation mode, the top input '0' of the selector 511S, i.e., Sdata (serial read data from memory cell) is provided to an output buffer 515S as SOP, which serves as the SIP for the next device. Otherwise (the ID generation mode), the bottom input path '1' is selected, i.e., the Sdata_id (serial id data) is provided to the output buffer 515S as SOP, which serves as the SIP for the next device, as shown in FIG. 5B.

In order to send the ID number serially to the next device, it must be clocked to a clock signal. A data shift clock generator 512 provides clock signal 'shift_clock' to the parallel to serial register 510, thereby synchronizing signal 'Sdata_id' (serial ID data) with the clock.

The shift register block 513 provides an ID output enable signal ('id_out_en'), which is generated to inform the number of shift clock cycles. The shift register block 513 shifts the OPE signal a number of bits equal to the bit length of the ID register plus 2 cycles, in order to provide a margin of time sufficient to perform serial data latch and adding operation. The shift register block 513 includes a one-cycle shift register and a (N+2)-cycle shift register for shifting the signal 'opei' and providing the shifted 'opei' to a selector (e.g., a multiplexer) 511Q. Also, the shift register block 513 includes a (N+1)-cycle shift register with an additional one-cycle shift register, together providing a shifted signal 'opei' to an OR gate. The resulting signal, 'id_out_en,' is provided to the data shift clock generator 512.

Figure 10:
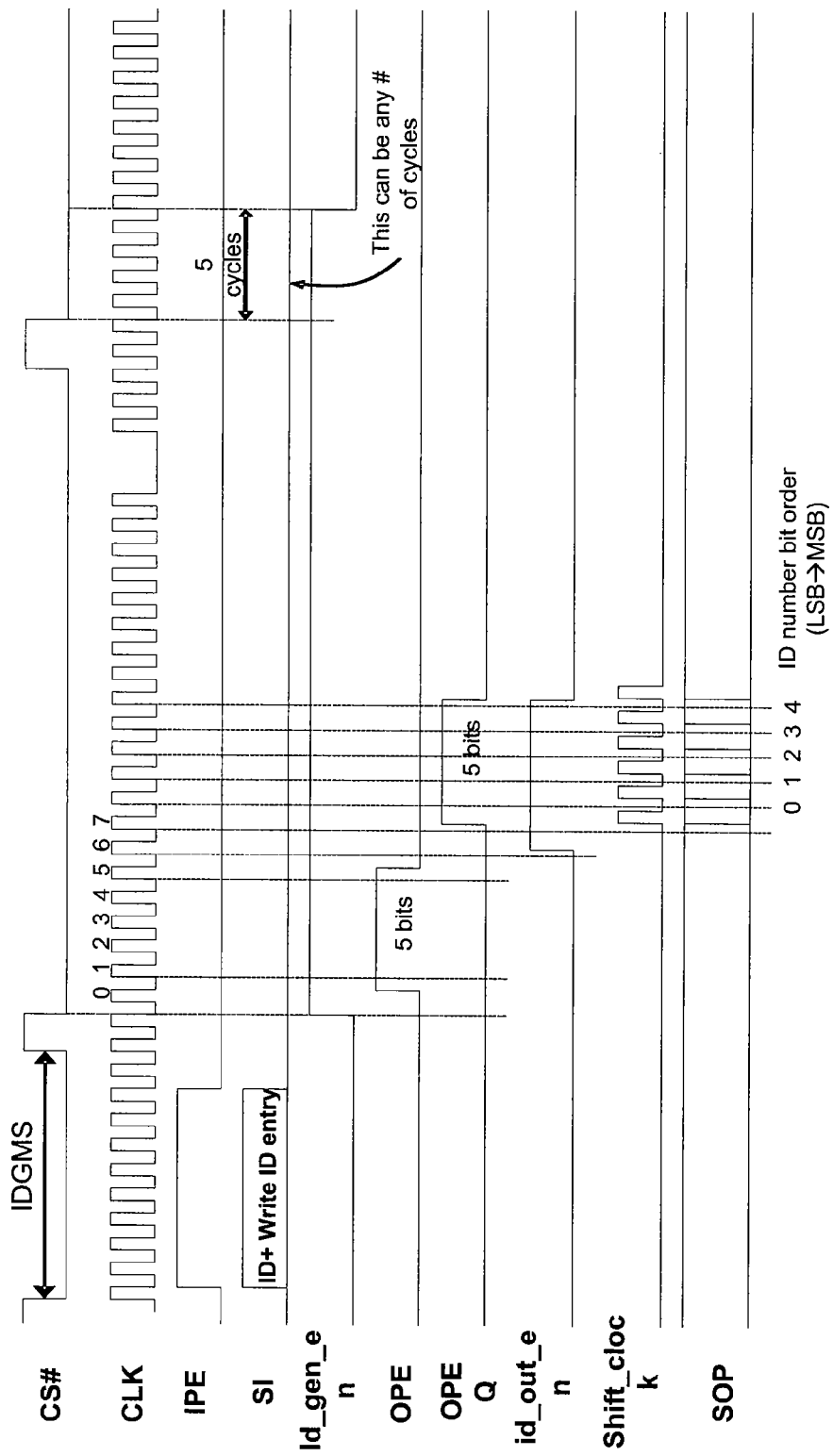
FIG. 10 is an illustration of a timing diagram of an ID output enable signal, a shift clock signal and other signals.
Figure 11:
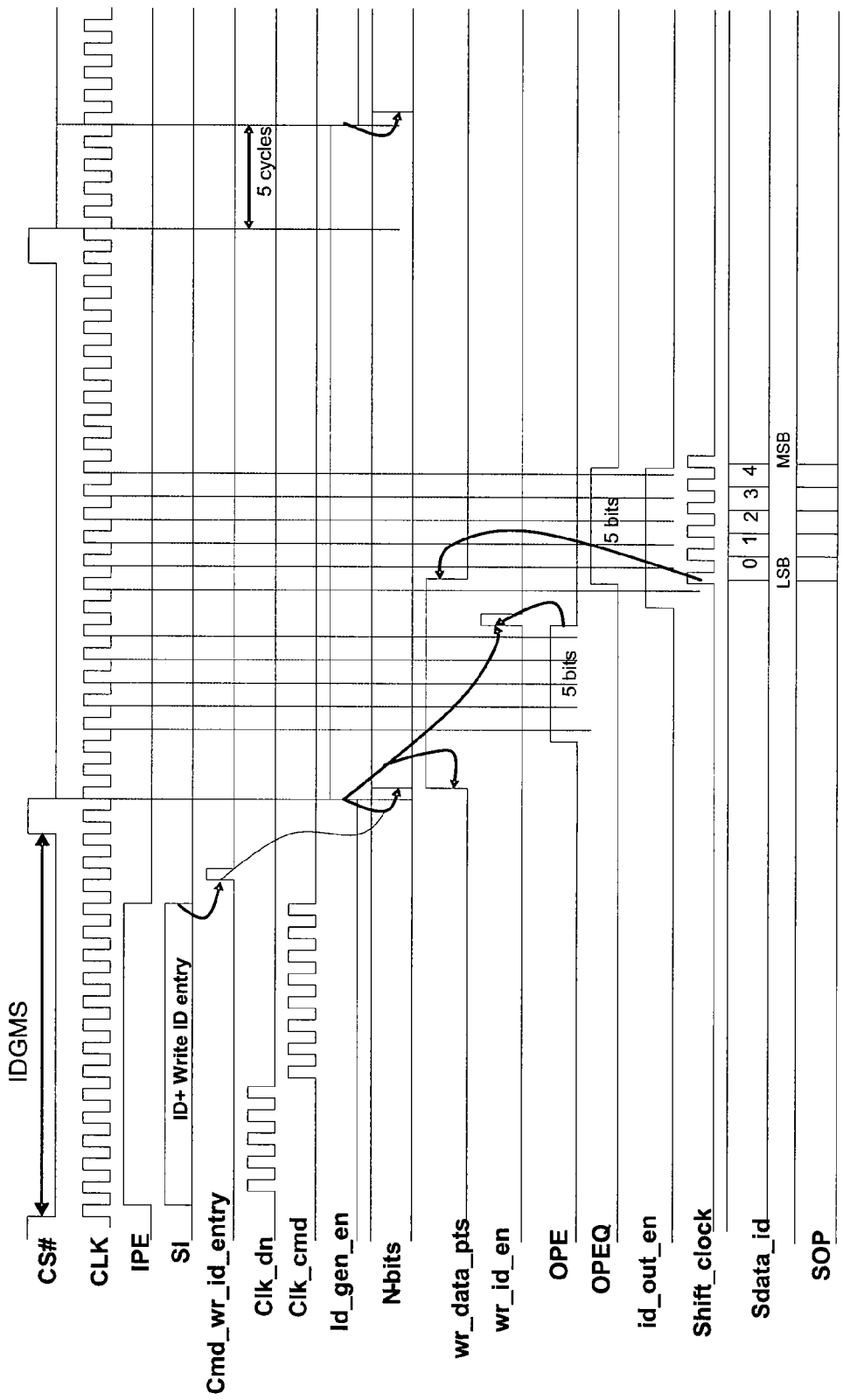
FIG. 11 is an illustration of a timing diagram of an ID generation and related signals.

Signal 'id_out_en' enables the signal 'shift_clock' at the data shift clock generator 512, causing the shift clock to issue one cycle earlier than the OPEQ signal is generated. As shown in FIG. 10. This function ensures proper timing of signals because the next device latches data at the first clock signal overlapped by the OPE signal (i.e., the OPEQ signal from the previous device). A shift clock is produced for a duration of cycles totaling the number of ID bits plus 1 cycle to ensure that previous data is not kept, which would cause a successive device to receive an incorrect ID number from the SOP of the present device. FIG. 11 illustrates the timing of various signals associated with the ID generation process described herein with reference to the example shown in FIGS. 5A, 5B and 5C.

The device controller 500 for ID generation also includes a plurality of input buffers. One input buffer 514-1 receives the chip select signal CS# and its buffered output signal is inverted by an inverter. The inverted CS# signal is provided as 'CS_en' to the ID generation controller 507. Another input buffer 514-2 receives the SI from the SIP input and provides it to the command register 502, the input DN register 504 and the ID temporary register 518. Another input buffer 514-3 receives the clock signal 'Clock' and its buffered output signal 'Clocki' is provided to the clock generator 501. Other input buffers 514-4 and 514-5 receive IPE and OPE, respectively, and their buffered output signals are provided to the selector 511E, the selected output signal of which is fed to the clock generator 501.

Furthermore, the device controller 500 includes an output buffer 515Q which provides the OPEQ signal to the OPE input of the next device (not shown). The OPEQ signal is a selected output signal from a selector (e.g., a multiplexer) 511Q that selects one of the output signals from the 1 cycle shift register and (N+2) cycle shift register of the shift register block 513. The selected output signal (i.e., the OPEQ signal) is transmitted to the OPE input of the next device.

For example, with reference to FIG. 3A (and FIG. 4A), FIG. 3B (and FIG. 4B) and FIGS. 5A-5C, in device 310-1 (410-1) the initial ID number or value '00000' (of the SI) is stored to the N-bit ID register 516. The N-bit adder 508 of the device 310-1 (410-1) adds +1 to the initial ID number and latches '10000' output data of the N-bit adder 508 to the parallel-to-serial register 510. The selector 511Q provides '10000' to the output buffer 515S as SOP '10000', which is provided to the SIP of next device 310-2 (410-2). The received ID number '10000' (of the SI) is stored to the N-bit ID register 516 of the device 310-2 (410-2) and '+1' adding is performed in the N-bit adder 508 thereof. The '01000' output data of the N-bit adder 508 is latched to the parallel-to-serial register 510 of the device 310-2 (410-2). The selector 511Q provides '01000' to the output buffer 515S as SOP '01000', which is provided to the SIP of next device 310-3 (410-3). The received ID number '01000' is stored in the N-bit ID register 516 of the device 310-3 (410-3). This process is continued to until the final device 310-$n$ (410-$n$) is reached. All bit order complies with LSB first and MSB last rule for ID generation mode. Thus, the device ID assigned at each device is the same as the received ID. The generated ID ('+1' added ID or the calculated ID) is provided to the SIP of the next device in the serial interconnection configuration.

Table 1 shows the devices and the assigned IDs according to the embodiment described above (LSB→MSB):

TABLE 1

| Device No. | Assigned ID |
| --- | --- |
| First Device | 00000 |
| Second Device | 10000 |
| Third Device | 01000 |
| Fourth Device | 11000 |
| Fifth Device | 00100 |

TABLE 1-continued

| Device No. | Assigned ID |
| --- | --- |
| 31$^{st}$ Device | 01111 |
| 32$^{nd}$ Device | 11111 |

The N-bit ID register 516 is filled with the ID number in the ID generation mode. This content is reset, for example, by a hard reset pin to an initial value setting. The content of the N-bit ID register 516 is compared with the input ID streams of the input DN register 504 when any normal operation starts.

In ID generation mode (and in contrast to normal operation), the device ID value and bit size may be altered, and is determined according to the length of time that the OPE signal is asserted. The ID temporary register 518 accommodates this function by storing each serial bit at the designated bit location without a serial data transfer.

Figure 12A:
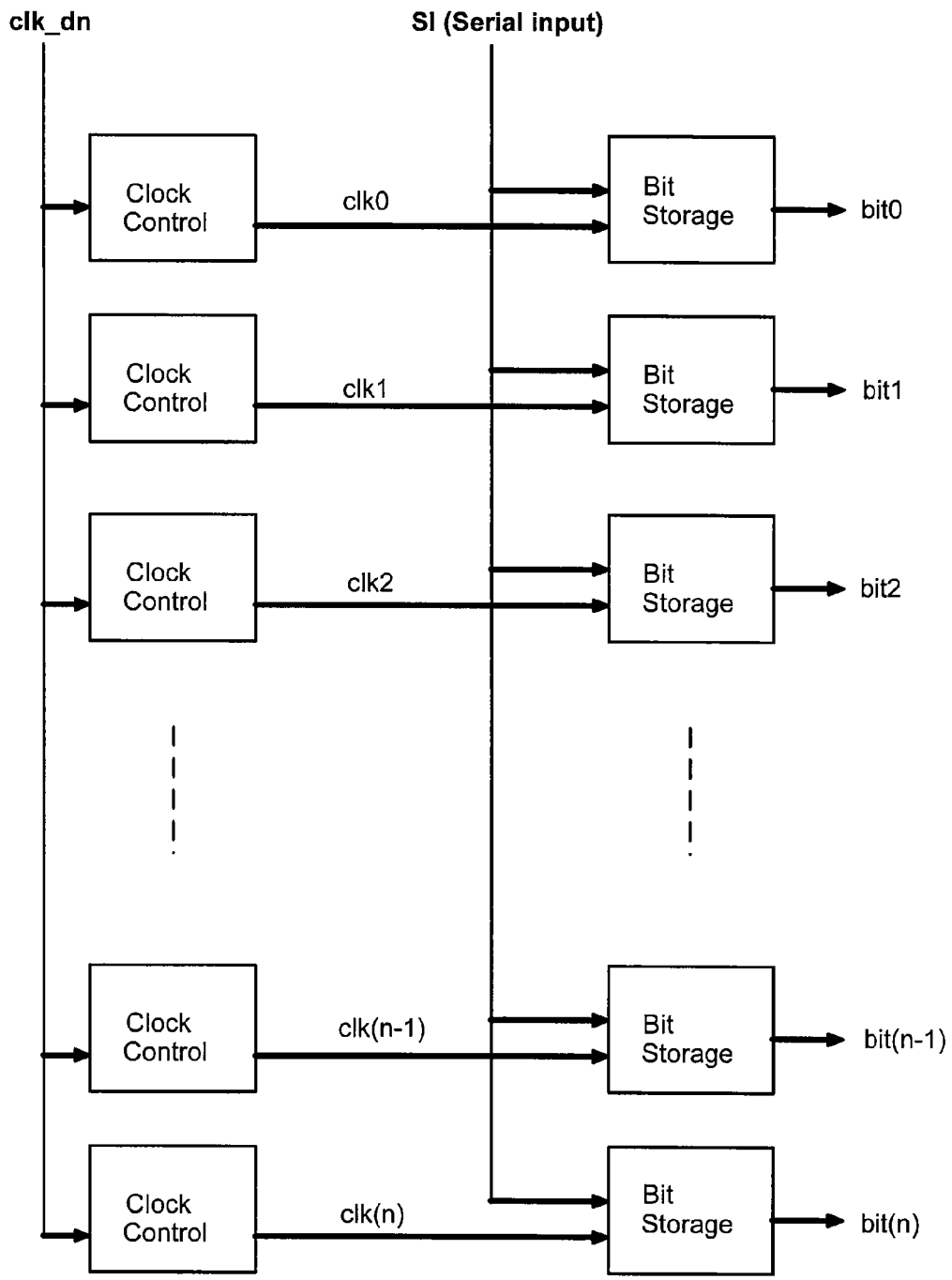
FIG. 12A is a block diagram illustrating an ID temporary register configuration.
Figure 12B:
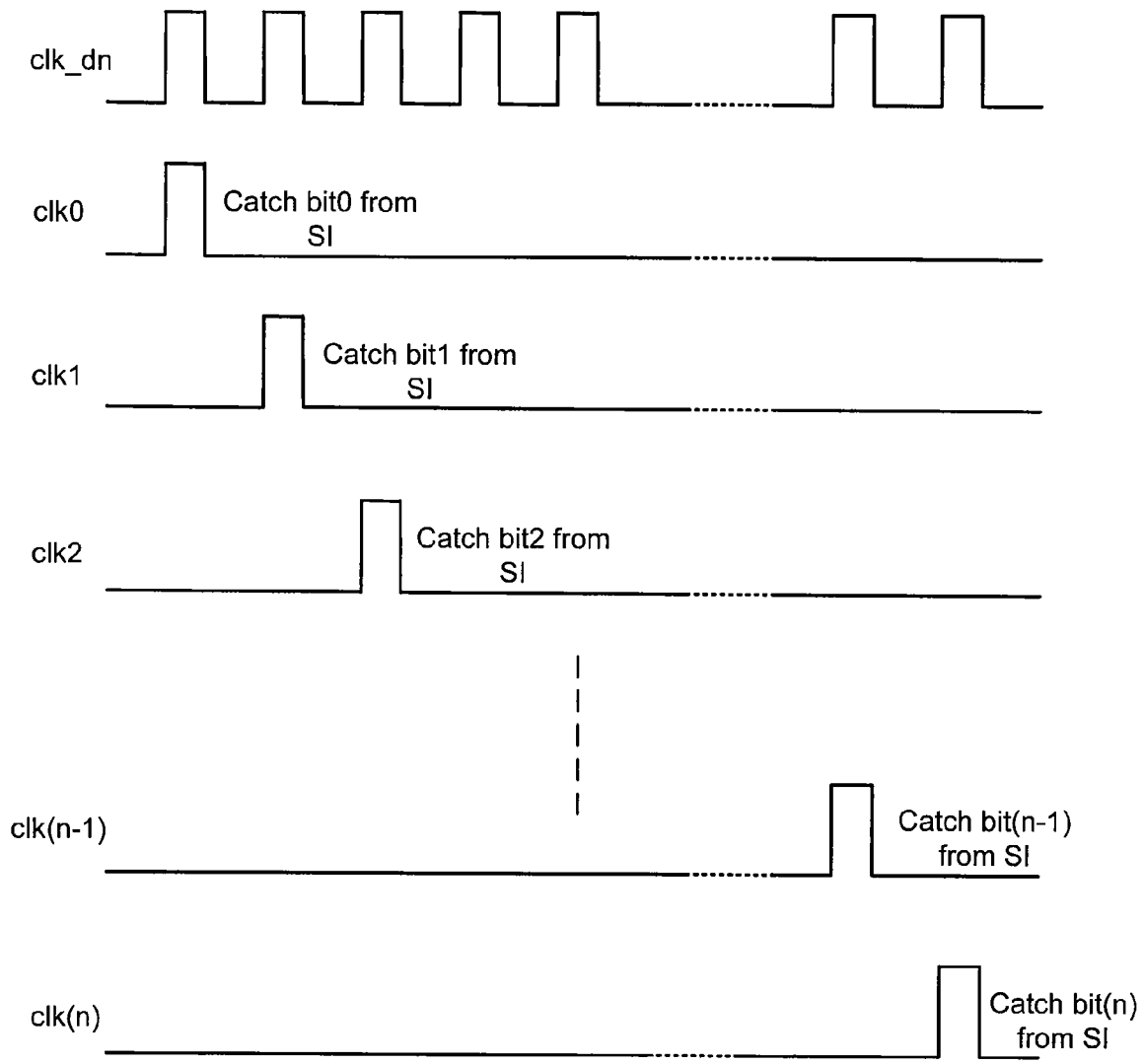
FIG. 12B is an illustration of a timing diagram of signals for an ID temporary register.

FIG. 12A shows the ID temporary register 518 shown in FIGS. 5A-5C. FIG. 12B shows signal timings for the ID temporary register 518. Referring to FIGS. 5A-5C, 12A and 12B, the ID temporary register 518 has (n+1) bit storages that correspond to (n+1) clock control blocks. In response to the DN clock 'clk_dn', the (n+1) clock control blocks provide clocks 'clk0'-'clk(n)', respectively, that are fed to the (n+1) bit storages. The serial input SI is in parallel fed to the (n+1) bit storages that store the SI data in response to the clocks 'clk0'-'clk(n)'. The stored data is provided as bit data 'bit0'-'bit(n)'.

It should be noted that the N-bit adder 508 provides one method of incrementing the received ID number. When implemented in multiple devices in a serial interconnection configuration, the ID generation logic has a cumulative effect of providing a unique device ID for each device, where the device ID is incremented by '1' at each device. Alternatively, a variety of logic can be substituted for the n-bit adder 508 to generate a unique device ID at each device.

Figure 13A:
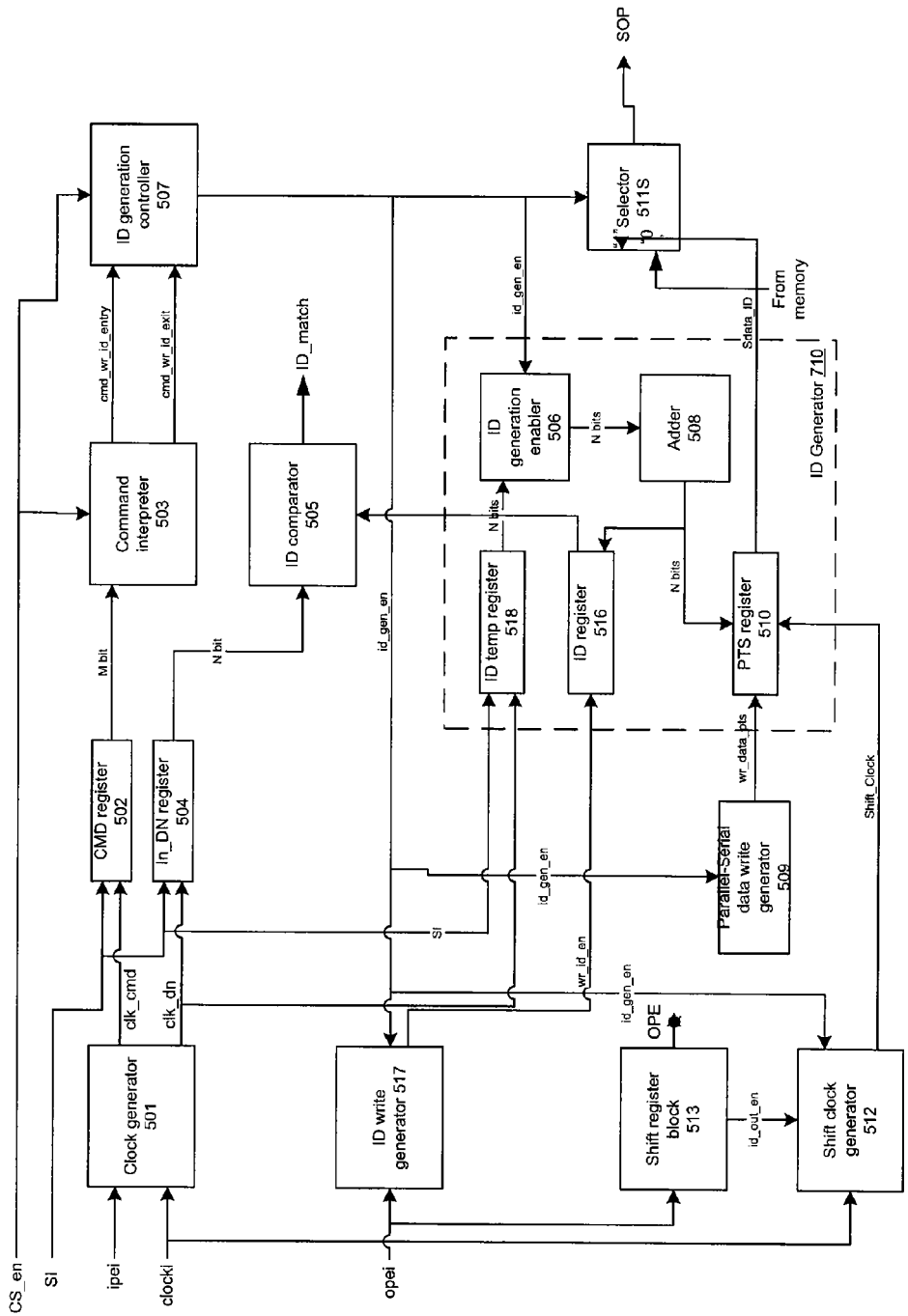
FIG. 13A is a high-level block diagram of logic that can be used to generate an ID for a device according to a second embodiment of the present invention.
Figure 13B:
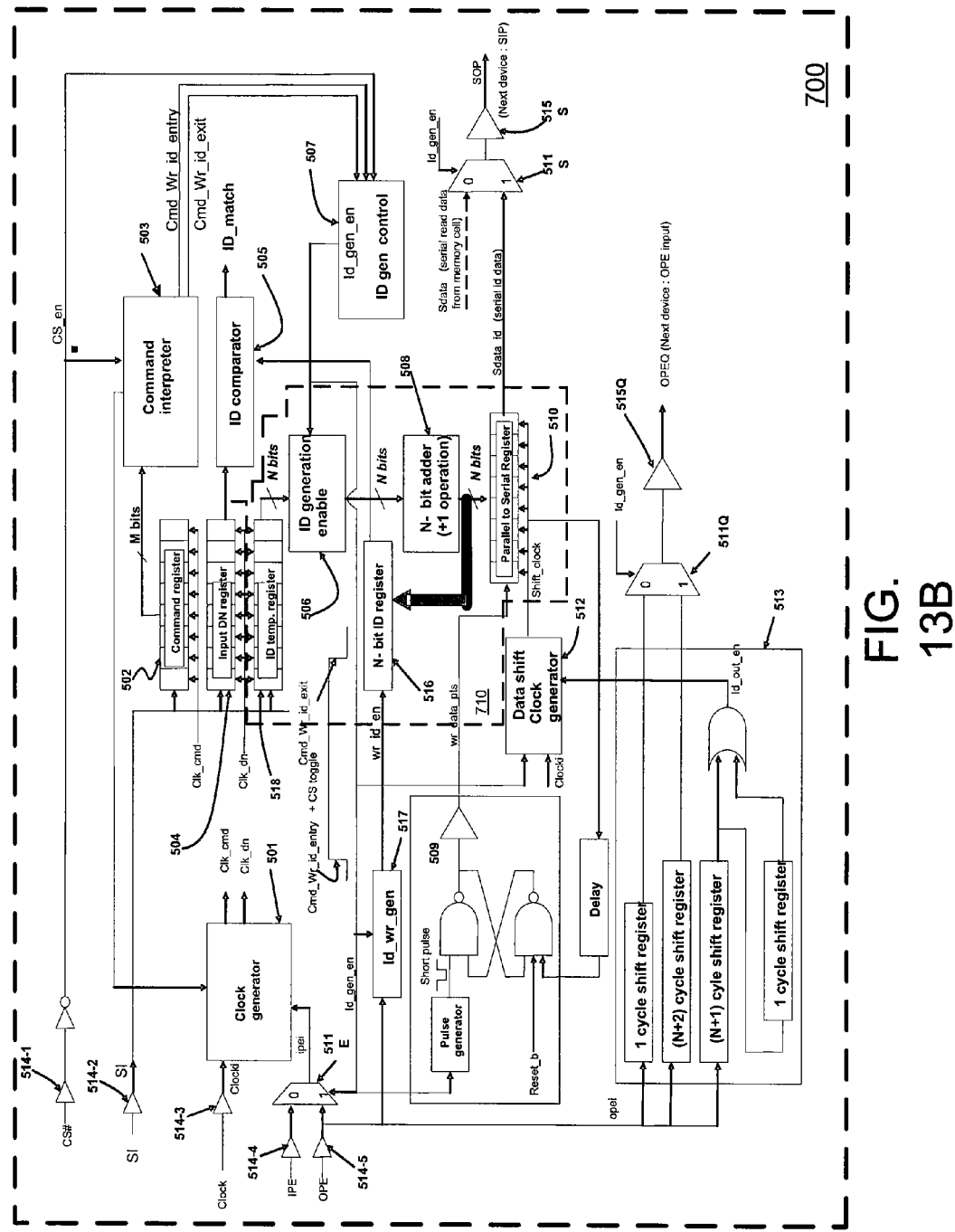
FIG. 13B is a detailed block diagram of the logic shown in FIG. 13A.
Figure 13C:
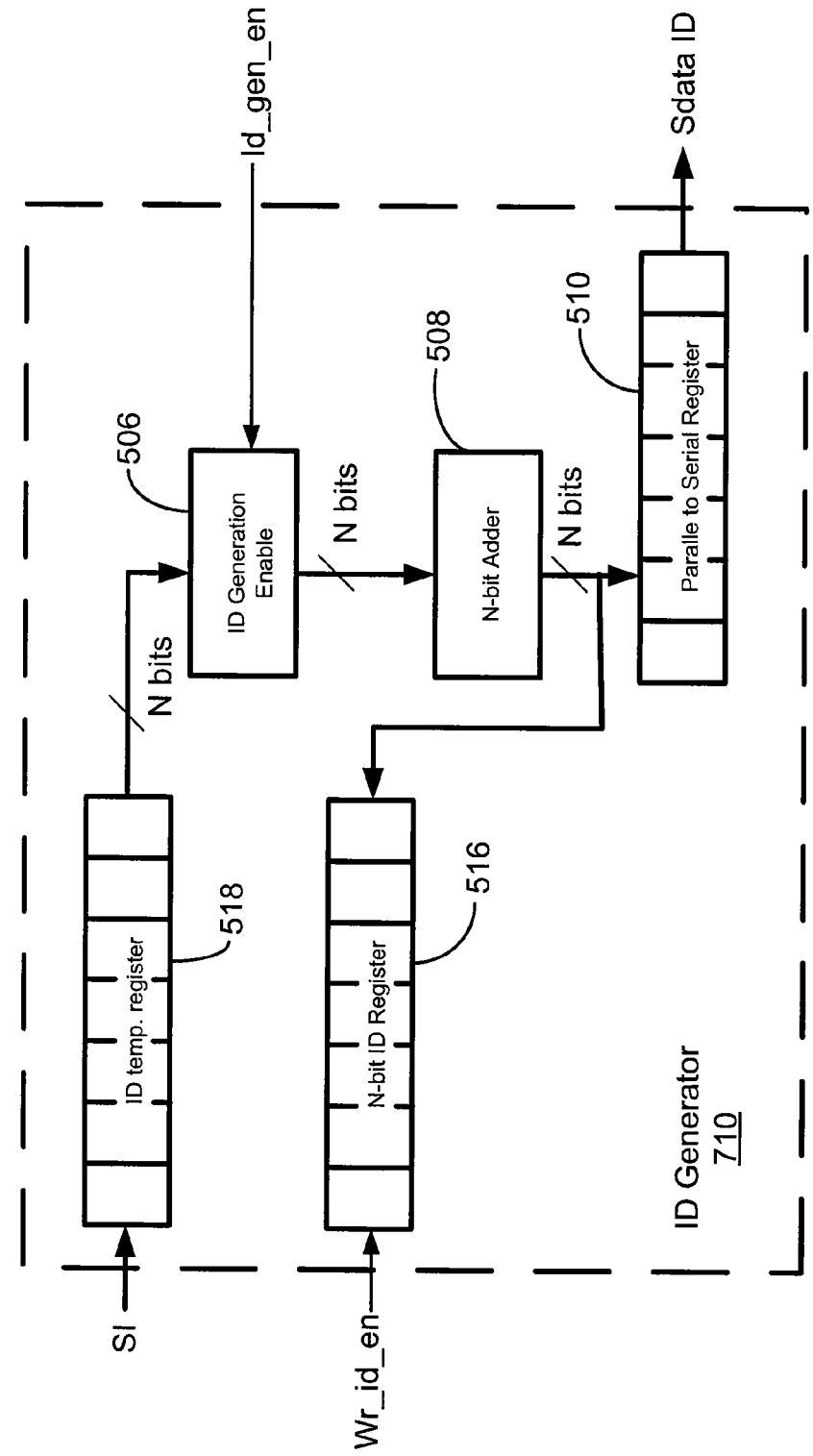
FIG. 13C is a block diagram of an ID generator shown in FIGS. 13A and 13B.
Figure 14:
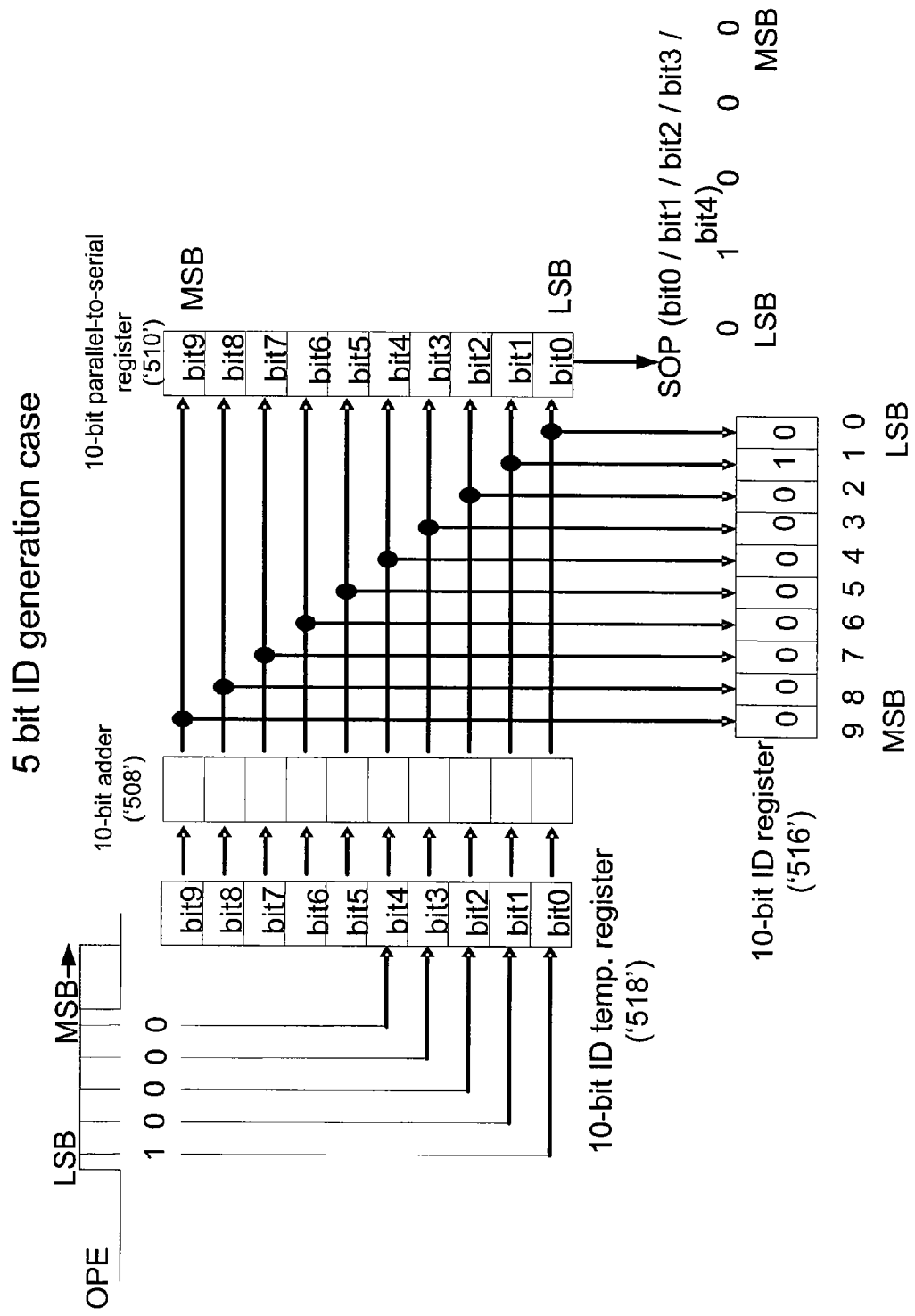
FIG. 14 is an illustration of an ID bit length control by an output port enable signal for the embodiment shown in FIG. 13A.

In another example, the ID generation logic associated with ID generation of device controller establishes a device ID as the result of the N-bit operation. This alternative requires that the output of the N-bit adder 508 is transferred to the N-bit ID register 516, and the N-bit ID register 516 stores this value rather than the received ID number, thereby establishing the device ID for the device, as shown in FIGS. 13A and 13B. An ID generator 710 of a device controller 700 of FIGS. 13A and 13B is shown in FIG. 13C. In FIG. 14, the 10-bit ID temporary register 518, the 10-bit ID register 516, the 10-bit adder 508 and the ID provider, exemplified as a 10-bit parallel-to-serial register 510, are shown during generation of a 5-bit device ID. Unlike the embodiment shown in FIG. 9B, 10-bit ID temporary register 518 transfers the ID bits to the 10-bit adder 508. The added or calculated ID by the 10-bit adder 508 is then provided to the 10-bit ID register 516 and the 10-bit parallel-to-serial register 510. All other operations of the device controller 700 shown in FIGS. 13A and 13B are similar to the device controller 500 described earlier.

To further illustrate the embodiment, for example, with reference to FIGS. 3A (and 4A), FIGS. 13A-13C and FIG. 14, device 310-1 (410-1) receive the '00000' (of the SI). The N-bit adder 508 adds +1 the SIP input and latches '10000' output data of the N-bit adder 508 to the N-bit ID register 516 and to the parallel-to-serial register 510. The selector 511Q provides '10000' to the output buffer 515S as SOP '10000', which is provided to the SIP of next device 310-2 (410-2). The '10000' (of the SI) received at device 310-2 (410-2) and '+1' adding is performed in the N-bit adder 508. The '01000' output data of the N-bit adder is latched to the N-bit ID register 516 and to the parallel-to-serial register 510. The selector 511Q provides '01000' to the output buffer 515S as SOP '01000', which is provided to the SIP of next device 310-3 (410-3). This process is continued to until the final device 310-n (410-n) is reached. All bit order complies with LSB first and MSB last rule for ID generation mode. Thus, the device ID assigned at each device is not the same as the received ID. The generated ID ('+1' added ID or the calculated ID) is assigned to the current device and is also provided to the SIP of the next device in the serial interconnection configuration.

Table 2 shows the devices and the assigned IDs according to the embodiment shown in FIGS. 13A and 13B (LSB→MSB):

TABLE 2

| Device No. | Received ID | Assigned ID |
| --- | --- | --- |
| First Device | 00000 | 10000 |
| Second Device | 10000 | 01000 |
| Third Device | 01000 | 11000 |
| Fourth Device | 11000 | 00100 |
| Fifth Device | 00100 | 10100 |
| — | — | — |
| 31$^{st}$ Device | 01111 | 11111 |

Figure 15A:
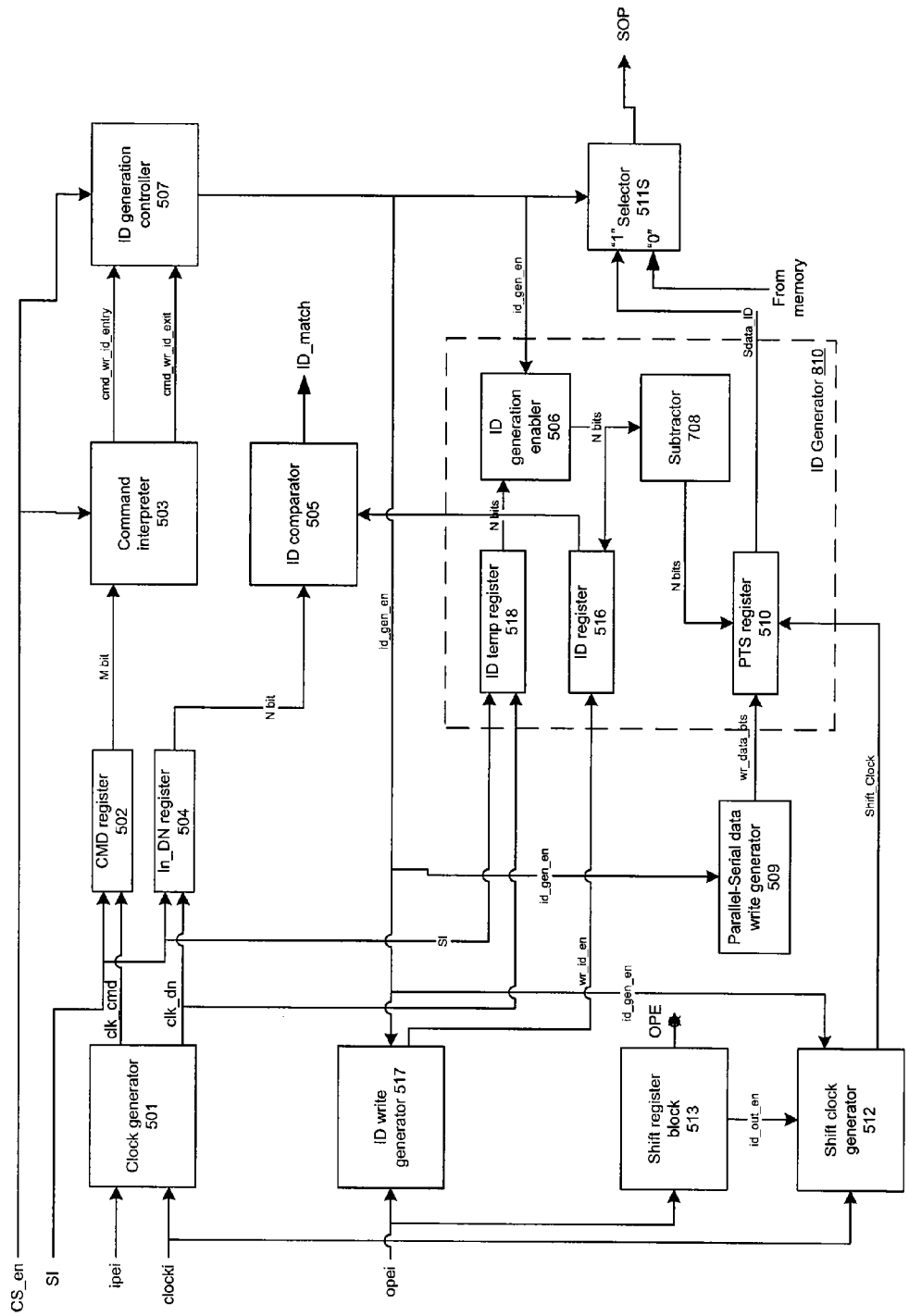
FIG. 15A is a high-level block diagram of logic that can be used to generate an ID for a device according to a third embodiment of the present invention.
Figure 15B:
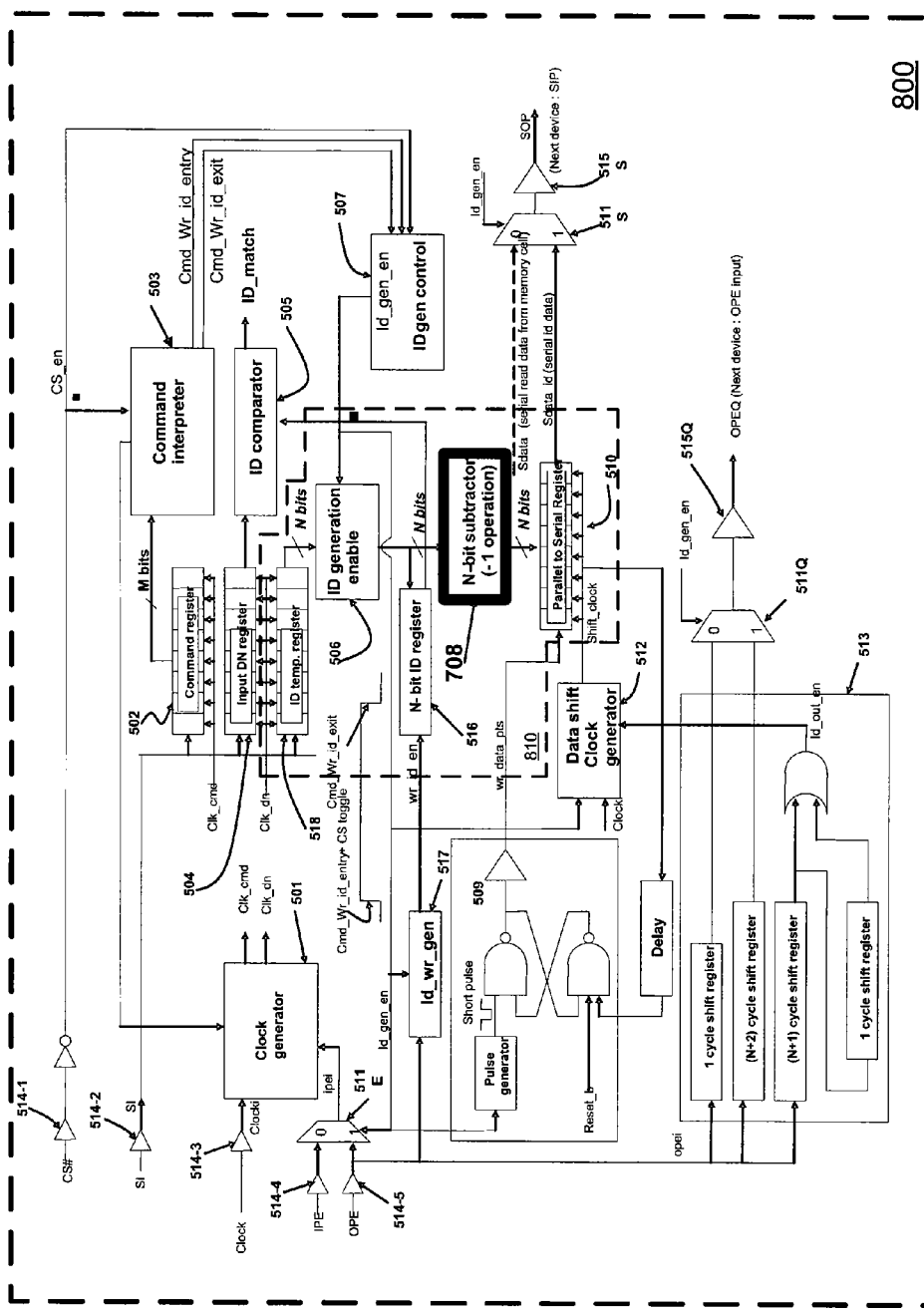
FIG. 15B is a detailed block diagram of the logic shown in FIG. 15A.
Figure 15C:
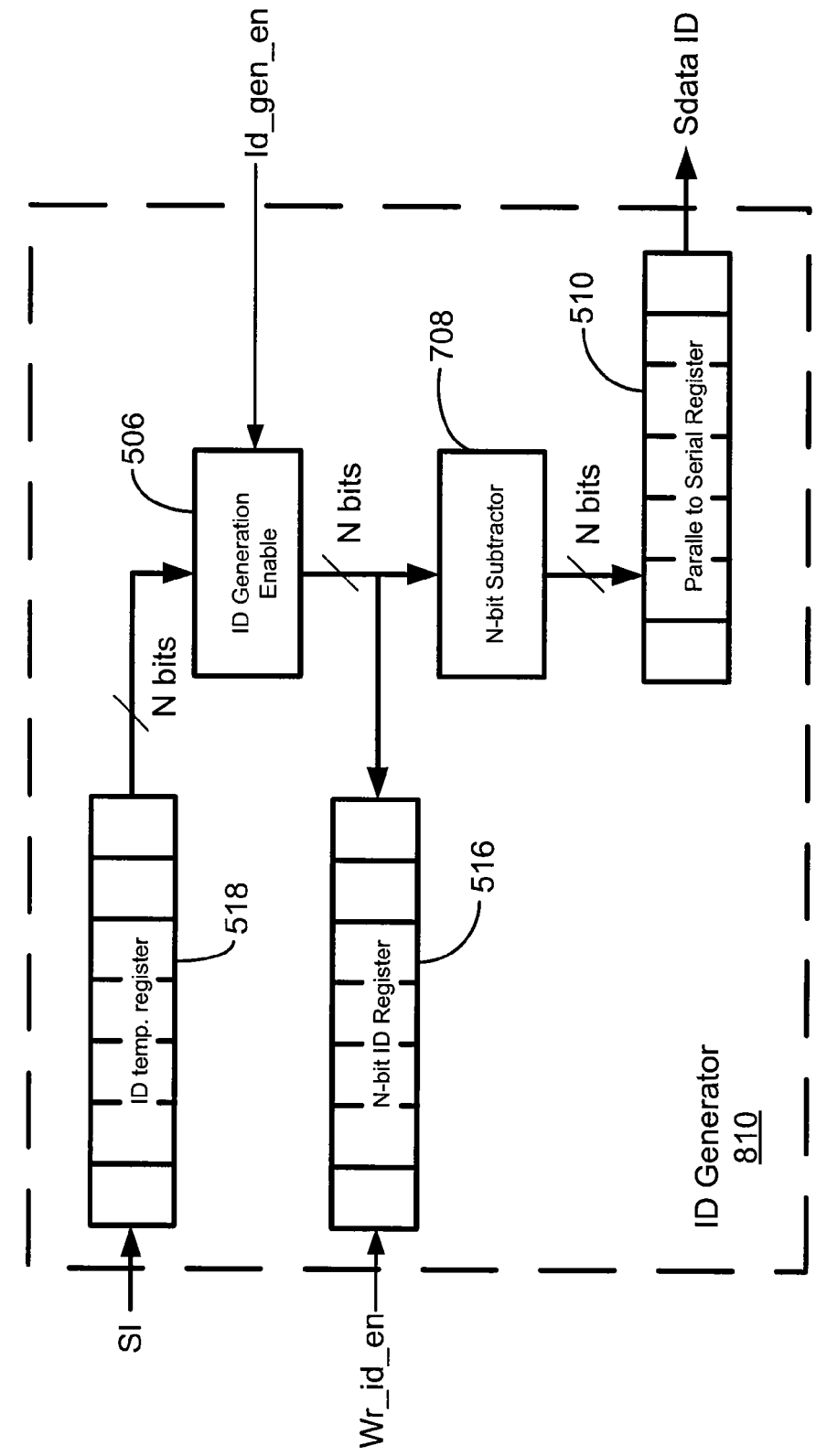
FIG. 15C is a block diagram of an ID generator shown in FIGS. 15A and 15B.

In yet another embodiment, the ID generation logic associated with ID generation of a device controller establishes a device ID as the result of an N-bit subtraction operation. For example, as shown in FIGS. 15A and 15B, an 'N-bit subtractor' could subtract '1' from the received ID number. An ID generator 810 of a device controller 800 of FIGS. 15A and 15B is shown in FIG. 15C. The device controller 800 has an N-bit subtractor 708, instead of the N-bit adder 508 shown in FIGS. 5B and 13B.

Referring to FIGS. 3A-3B, 4A-4B and 15A-15C, an input ID number or value '11111' of the SIP received at device 310-1 (410-1) is stored to the N-bit ID register 516. An N-bit subtractor 708 subtracts 1 from the SIP input and latches '11110' output data of the N-bit subtractor 708 to the parallel-to-serial register 510. The selector 511Q provides '11110' to the output buffer 515Q as SOP '11110', which is provided to the SIP of next device 310-2 (410-2). The '11110' (of the SI) is stored to the N-bit ID register 516 of this device 310-2 (410-2) and −'1' subtraction is performed in the N-bit subtractor 708. The '11101' output data of the N-bit subtractor 708 is latched to the parallel-to-serial register 510. The selector 511Q provides '11101' to the output buffer 515S as SOP '11101', which is provided to the SIP of next device 310-3 (410-3). This process is continued to until the final device 310-n (410-n) is reached. All bit order complies with LSB first and MSB last rule for ID generation mode. Thus, the device ID assigned at each device is the same as the received ID. The generated ID (−'1' subtracted ID or the calculated ID) is provided to the SIP of the next device in the serial interconnection.

Table 3 shows the devices and the assigned IDs according to the embodiment described above (LSB→MSB):

TABLE 3

| Device No. | Assigned ID |
| --- | --- |
| First Device | 11111 |
| Second Device | 01111 |
| Third Device | 10111 |
| Fourth Device | 00111 |
| Fifth Device | 11011 |

TABLE 3-continued

| Device No. | Assigned ID |
| --- | --- |
| — | — |
| 31$^{st}$ Device | 10000 |
| 32$^{nd}$ Device | 00000 |

Figure 16:
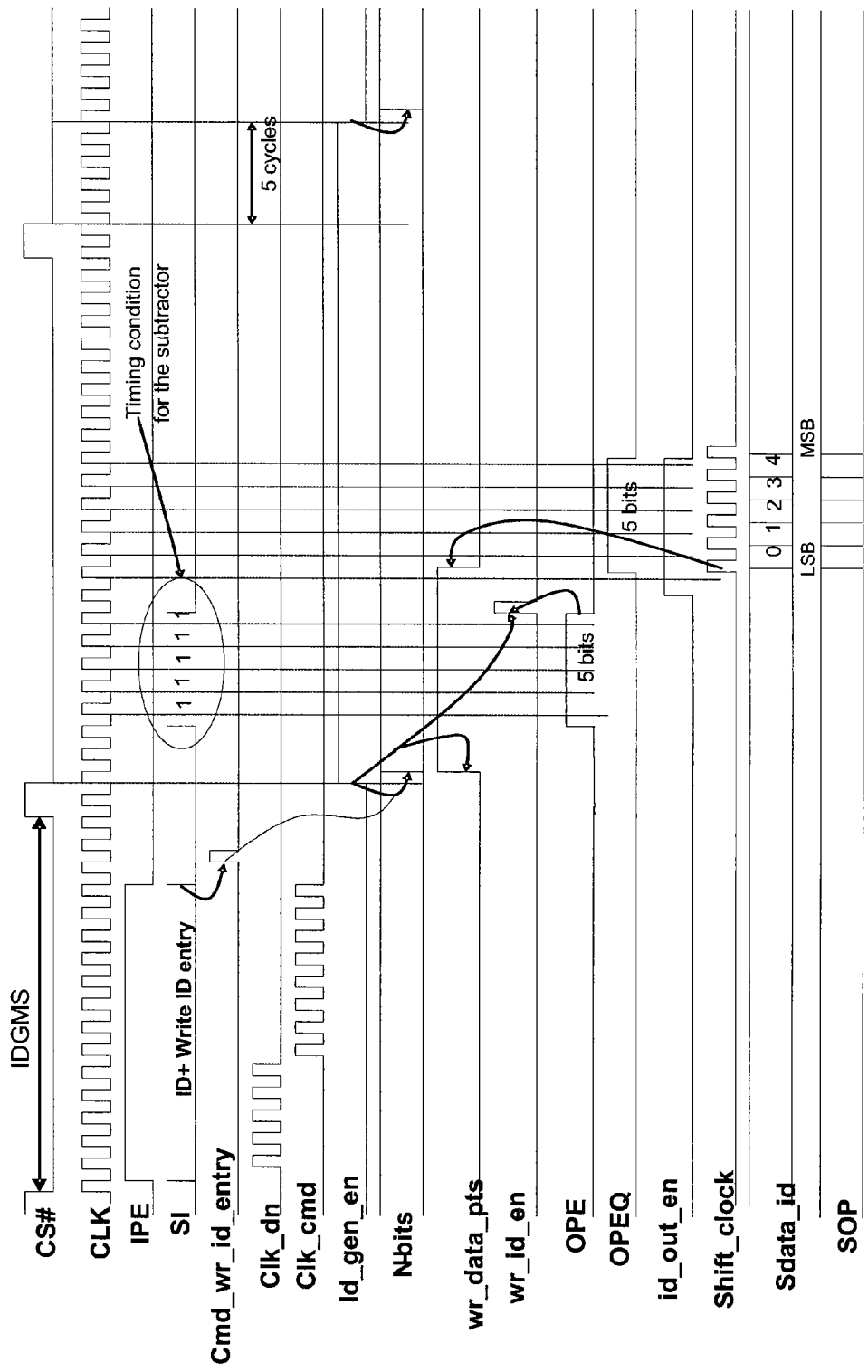
FIG. 16 is an illustration of a timing diagram of signals for the ID generation logic illustrated in FIG. 15A.
Figure 17:
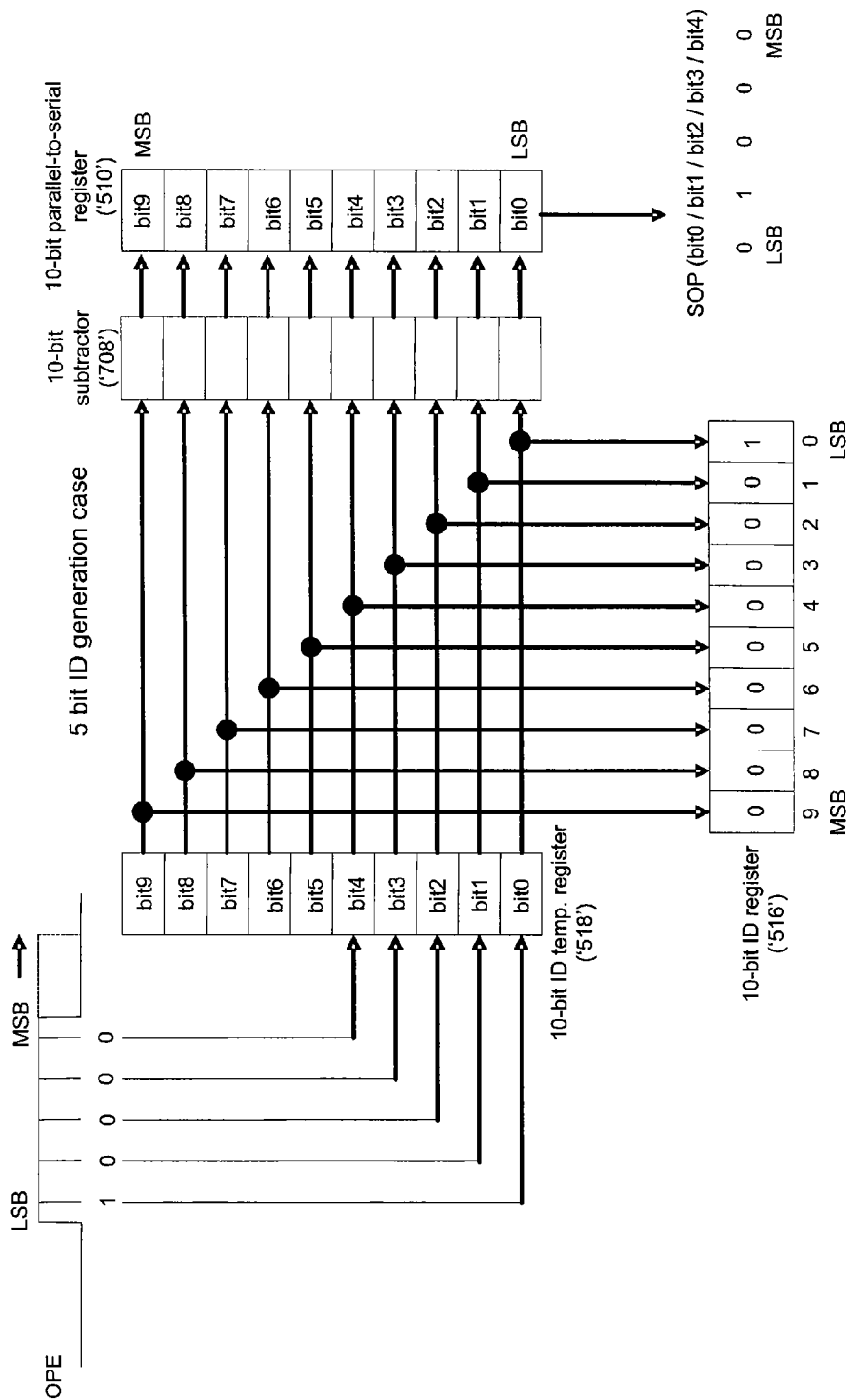
FIG. 17 is an illustration of an ID bit length control by an output port enable signal for the embodiment shown in FIG. 15A.

Due to the "count-down" ID generation of this embodiment, the timing of the signals is different from that shown in FIG. 11. FIG. 16 illustrates the timing of various signals associated with the ID generation process described herein with reference to the embodiment shown in FIGS. 15A, 15B and 15C. FIG. 17 illustrate an ID bit length control by the OPE signal for the embodiment shown in FIG. 15A.

Referring to FIGS. 15A-15C, 16 and 17, the 10-bit ID temporary register 518 transfers the ID bits to the 10 bit ID register 516 and to the 10-bit subtractor 708. The subtracted or calculated ID by the subtractor 708 is then provided to the 10-bit parallel-to-serial register 510. All other operations of the device controller 800 are similar to the embodiments of FIGS. 5A-5B and 13A-13B described earlier.

It would be apparent to a person skilled in the art to implement the embodiment shown in FIGS. 13A, 13B and 13C with the N-bit subtractor 708 shown in FIGS. 15A, 15B and 15C. Table 4 shows the devices and the assigned IDs according to the embodiment described above (LSB→MSB):

TABLE 4

| Device No. | Received ID | Assigned ID |
| --- | --- | --- |
| First Device | 11111 | 01111 |
| Second Device | 01111 | 10111 |
| Third Device | 10111 | 00111 |
| Fourth Device | 00111 | 11011 |
| Fifth Device | 11011 | 11010 |
| — | — | — |
| 31$^{st}$ Device | 10000 | 00000 |

Likewise, it would be apparent to implement a system where an integer other than '1' could be added or subtracted to the received ID number, providing a non-consecutive sequence of device ID numbers for a series of devices.

The ID generation logic and methods described above can be incorporated in memory devices, such as, for example, Flash memory devices that require device identifiers without external hard pin assignment. Embodiments of the ID generation logic also can be implemented as a single or discreet device to support the ID generation of any memory device. For single device implementations, pin allocations are changed according to the internal signal requirement of the selected memory device.

The aforementioned embodiments of device ID generation can be altered for implementation in a number of different systems without departing from the principles described herein. For example, with reference to FIGS. 5A and 5B, a command based on 'write ID entry' can be introduced along with the 'write ID exit' by the CS# transition from low to high and low. Moreover, one dedicated pin can be assigned to receive 'entry mode enable,' replacing the role of the command 'write ID entry.'

An alternative way of the ID generation exit is to use an exit command or internal exit logic implementation in the device, instead of the CS# transition.

Apart from flash memory including MISL (Multi-Independent Serial Link), the technique described herein may be applied without any limitation, to any devices in serial interconnection configuration that need ID numbers in order to select one of connected devices.

There are many variations to the examples. The active "high" or "low" logic signal may be changed to an active "low" or "high" logic signal, respectively. The logic "high" and "low" states of the signals may be represented by the low and high supply voltages Vss and Vdd, respectively.

In the examples described above, the device elements and circuits are connected to each other as shown in the figures, for the sake of simplicity. In practical applications of the techniques to memory systems, devices, elements, circuits, etc. may be connected or coupled directly to each other. As well, devices, elements, circuits etc. may be connected or coupled indirectly to each other through other devices, elements, circuits, etc., as necessary for operation of the memory systems.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A device identifier establisher for establishing a device identifier (ID) for a device configured in a serial interconnection configuration having a plurality of devices, the device identifier establisher comprising:
    a clock input for receiving a clock signal;
    an ID producer for producing a device ID in response to an M-bit input signal received at an input of the device, the M-bit input signal received at the input of the device in response to an assertion of an input enable signal and including an N-bit ID corresponding to the device ID, and outputting an M-bit output signal in response to an assertion of an output enable signal, the M-bit output signal including an N-bit data corresponding to the device ID through an output of the device to a subsequent device in the serial interconnection configuration synchronously with the clock signal, M and N being an integer that is one or greater than one;
    an ID register for storing the N-bit data as an assigned ID for the device; and
    a control input for receiving a control signal, the ID register being configured to store the N-bit data as an assigned ID in response to the received control signal and the received control signal being produced in response to the output enable signal.

2. The device identifier establisher of claim 1, wherein the M-bit input signal received at the device includes a previous device ID corresponding to a previous device in the serial interconnection configuration, and the device ID associated with the M-bit output signal includes the N-bit data corresponding to the device ID of the device receiving the M-bit input signal.

3. The device identifier establisher of claim 1, wherein the plurality of devices is connected with a link.

4. The device identifier establisher of claim 1, wherein each of the plurality of devices comprises a memory device.

5. The device identifier establisher of claim 1, wherein the ID producer comprises:
    an ID calculator for determining the N-bit ID from the M-bit input signal and producing a calculated value based on the N-bit ID and a predetermined number; and
    an ID provider for providing the device ID corresponding to the N-bit data in accordance with the calculated value.

6. The device identifier establisher of claim 5, wherein the calculated value is a calculation result of the N-bit ID and an integer.

7. The device identifier establisher of claim 5, wherein the ID provider includes a shift circuit for shifting out the N-bit ID synchronously with clock.

8. The device identifier establisher of claim 5, further comprising an ID production controller for controlling the production of the N-bit ID in response to commands in the M-bit input signal.

9. The device identifier establisher of claim 1, wherein the device receives command or data signals at the input and transmits the command or data signals at the output.

10. A device configured in a serial interconnection configuration of a plurality of devices, the device comprising:
    a clock input for receiving a clock signal;
    a device identifier (ID) establisher for establishing a device ID for the device, the device ID establisher including an ID producer configured to:
        provide the device ID in response to an M-bit input signal received at an input of the device, the M-bit input signal received in response to an assertion of an input enable signal and including an N-bit ID corresponding to the device ID;
        output an M-bit output signal in response to an assertion of an output enable signal, the M-bit output signal including an N-bit data corresponding to the device ID through an output of the device to a subsequent device in the serial interconnection configuration synchronously with the clock signal, M and N being an integer that is one or greater than one;
    an ID register for storing the N-bit data as an assigned ID for the device; and
    a control input for receiving a control signal, the ID register being configured to store the N-bit data as an assigned ID in response to the received control signal, the received control signal being produced in response to the output enable signal.

11. The device of claim 10, wherein each of the plurality of devices comprises a memory device.

12. The device of claim 11, wherein the memory device is a random access memory or a Flash memory.

13. The device of claim 10, wherein the M-bit input signal received at the device includes a previous device ID corresponding to a previous device in the serial interconnection configuration, and the device ID included in the M-bit output signal includes the N-bit data corresponding to the device ID of the device receiving the input signal.

14. The device of claim 10, wherein the plurality of devices are connected with a link.

15. The device of claim 10, wherein the ID producer comprises:
    a calculator for producing a calculated value based on the N-bit ID and a predetermined number; and
    an ID provider for providing the device ID corresponding to the N-bit data in accordance with the calculated value.

16. The device of claim 15, wherein the calculated value is a calculation result of the N-bit ID and an integer.

17. The device of claim 15, wherein the ID provider includes a shift circuit for shifting out the N-bit ID synchronously with clock.

18. The device of claim 15, further comprising an ID production controller for controlling the production of the N-bit ID in response to commands in the M-bit input signal.

19. The device of claim 10, wherein the device receives command or data signals at the input and transmits the command or data signals at the output.

20. A serial interconnection configuration of a plurality of devices, each of the devices comprising:
an input for receiving an M-bit input signal in response to an assertion of an input enable signal;
an output for transferring an M-bit output signal in response to an assertion of an output enable signal;
a clock input for receiving a clock signal;
a device identifier (ID) establisher for establishing a device ID for the device, the device ID establisher having an ID producer for providing the device ID in response to the M-bit input signal received at the input of the device, the M-bit input signal including a value associated with the device ID of the device, the M-bit output signal including an N-bit data corresponding to the device ID through the output of the device to a subsequent device in the serial interconnection configuration synchronously with the clock signal, M and N being an integer that is one or greater than one;
an ID register for storing the N-bit data as an assigned ID for the device; and
a control input for receiving a control signal, the ID register being configured to store the N-bit data as an assigned ID in response to the received control signal, the received control signal being produced in response to the output enable signal.

21. The serial interconnection configuration of claim 20, wherein the plurality of devices is connected with a link.

22. The serial interconnection configuration of claim 20, wherein each of the plurality of devices comprises a memory device.

23. The serial interconnection configuration of claim 20, wherein the memory device is a random access memory or a Flash memory.

24. The serial interconnection configuration of claim 20, wherein the input signal received at the device includes a previous device ID corresponding to a previous device in the serial interconnection configuration, and the device ID associated with the M-bit output signal includes the N-bit data corresponding to the device ID of the device receiving the input signal.

25. The serial interconnection configuration of claim 20, wherein the ID producer comprises:
a calculator for producing a calculated value based on an N-bit ID and a predetermined number; and
an ID provider for providing the device ID corresponding to the N-bit data in accordance with the calculated value.

26. The serial interconnection configuration of claim 25, wherein the calculated value is a calculation result of the N-bit ID and an integer.

27. The serial interconnection configuration of claim 25, wherein the ID provider includes a shift circuit for shifting out the N-bit ID synchronously with the clock signal.

28. The serial interconnection configuration of claim 25, wherein the N-bit ID is included in the M-bit input signal.

29. The serial interconnection configuration of claim 25, further comprising an ID production controller for controlling the production of the N-bit ID in response to commands in the M-bit input signal.

30. The serial interconnection configuration of claim 22, wherein the device receives command or data signals at the input and transmits the command or data signals at the output.

31. A method for establishing a device identifier (ID) for a device configured in a serial interconnection configuration having a plurality of devices, the method comprising:
receiving a clock signal;
producing a device ID in response to an M-bit input signal, the M-bit input signal received in response to an assertion of an input enable signal, the M-bit input signal including a value associated with the device ID of the device;
outputting, to a subsequent device in the serial interconnection configuration, an M-bit output signal in response to an assertion of an output enable signal, the M-bit output signal including an N-bit data corresponding to the device ID through an output of the device;
assigning the N-bit data as the device ID for the device, the assigning comprising storing the N-bit data as an assigned ID for the device in response to a control signal, the control signal being produced in response to the output enable signal,
wherein the producing and outputting are synchronous with the clock signal and, M and N being an integer that is one or greater than one.

32. The method of claim 31, further comprising resetting the device ID of the devices to a predetermined value prior to the step of generating the ID.

33. The method of claim 32, wherein the step of resetting the device ID is performed in a parallel manner to all devices.

34. The method of claim 31, wherein the step of producing the ID is in response to an ID production command contained in the M-bit input signal.

35. The method of claim 31 wherein the step of producing the device ID comprises:
producing an N-bit ID;
calculating a value based on the N-bit ID and a predetermined number; and
providing the device ID corresponding to the N-bit data in accordance with the calculated value.

36. The method of claim 35, wherein the calculated value is a calculation result of the N-bit ID and an integer.

37. The method of claim 35, wherein the step of providing the device ID includes shifting out the N-bit ID synchronously with the clock.

38. The method of claim 35, wherein the N-bit ID is included in the M-bit input signal.

39. The method of claim 35, further comprising controlling the production of the N-bit ID in response to commands in the M-bit input signal.

40. The method of claim 35, wherein the step of calculating comprises adding the value of the integer to the value of the N-bit ID.

41. The method of claim 35, wherein the step of calculating comprises subtracting the value of the integer from the N-bit ID.

* * * * *